US009918035B2

(12) United States Patent
Schein et al.

(10) Patent No.: US 9,918,035 B2
(45) Date of Patent: Mar. 13, 2018

(54) INTERACTIVE COMPUTER SYSTEM FOR PROVIDING TELEVISION SCHEDULE INFORMATION

(75) Inventors: Steven M. Schein, Menlo Park, CA (US); Sean A. O'Brien, San Jose, CA (US); Brian L. Klosterman, San Ramon, CA (US); Kenneth A. Milnes, Fremont, CA (US)

(73) Assignee: Rovi Guides, Inc., San Jose, CA (US)

( * ) Notice: Subject to any disclaimer, the term of this patent is extended or adjusted under 35 U.S.C. 154(b) by 1378 days.

(21) Appl. No.: 12/551,422

(22) Filed: Aug. 31, 2009

(65) Prior Publication Data

US 2010/0115413 A1     May 6, 2010

Related U.S. Application Data

(60) Division of application No. 11/147,802, filed on Jun. 7, 2005, now abandoned, which is a continuation of
(Continued)

(51) Int. Cl.
*H04N 21/431*     (2011.01)
*H04N 5/445*     (2011.01)
(Continued)

(52) U.S. Cl.
CPC ......... *H04N 5/44543* (2013.01); *H04N 5/782* (2013.01); *H04N 7/08* (2013.01);
(Continued)

(58) Field of Classification Search
CPC ........... H04N 21/4316; H04N 21/4222; H04N 21/4782; H04N 21/4828; H04N 21/482;
(Continued)

(56) References Cited

U.S. PATENT DOCUMENTS

| 4,024,401 A | 5/1977 | Bernstein et al. |
| 4,081,753 A | 3/1978 | Miller |

(Continued)

FOREIGN PATENT DOCUMENTS

| CA | 2345161 A1 | 6/1994 |
| DE | 31 51 492 | 7/1983 |

(Continued)

OTHER PUBLICATIONS

Comppton et al,. "Internet CNN Newsroom: The Design of a Design of a Digital Video News magazine" May 12, 1995. or a further detailed document can be accessed from—http://dspace.mit.edu/bitstream/handle/1721.1/37777/33350116.pdf?sequence=1.*

(Continued)

*Primary Examiner* — Tadeese Hailu
(74) *Attorney, Agent, or Firm* — Haley Guiliano LLP

(57) ABSTRACT

The present invention provides systems and methods for providing television schedule and/or listing information to a viewer, and for allowing the viewer to link, search, select and interact with information in a remote database, e.g., a database on the internet. The television schedule and/or listing information can be displayed on a variety of viewer interfaces, such as televisions screens, computer monitors, PCTV screens and the like. The television schedule and/or listing information may be stored on the viewer's computer, television, PCTV, or a remote server (e.g., a website), or the television schedule and/or listing information may be downloaded from a remote database to the viewer's computer, television or PCTV.

61 Claims, 23 Drawing Sheets

Related U.S. Application Data application No. 10/047,127, filed on Jan. 14, 2002, now abandoned, which is a continuation of application No. 08/837,025, filed on Apr. 11, 1997, now Pat. No. 6,388,714, which is a continuation-in-part of application No. 08/537,650, filed on Oct. 2, 1995, now abandoned.

(60) Provisional application No. 60/022,826, filed on Jul. 26, 1996, provisional application No. 60/015,648, filed on Apr. 19, 1996.

(51) Int. Cl.
| | | |
|---|---|---|
| H04N 5/782 | (2006.01) | |
| H04N 7/08 | (2006.01) | |
| H04N 7/088 | (2006.01) | |
| H04N 7/16 | (2011.01) | |
| H04N 21/2362 | (2011.01) | |
| H04N 21/2543 | (2011.01) | |
| H04N 21/258 | (2011.01) | |
| H04N 21/262 | (2011.01) | |
| H04N 21/41 | (2011.01) | |
| H04N 21/4143 | (2011.01) | |
| H04N 21/4227 | (2011.01) | |
| H04N 21/433 | (2011.01) | |
| H04N 21/434 | (2011.01) | |
| H04N 21/441 | (2011.01) | |
| H04N 21/442 | (2011.01) | |
| H04N 21/443 | (2011.01) | |
| H04N 21/45 | (2011.01) | |
| H04N 21/458 | (2011.01) | |
| H04N 21/462 | (2011.01) | |
| H04N 21/472 | (2011.01) | |
| H04N 21/475 | (2011.01) | |
| H04N 21/478 | (2011.01) | |
| H04N 21/4782 | (2011.01) | |
| H04N 21/4786 | (2011.01) | |
| H04N 21/482 | (2011.01) | |
| H04N 21/81 | (2011.01) | |
| H04N 21/84 | (2011.01) | |
| H04N 21/858 | (2011.01) | |
| H04N 5/45 | (2011.01) | |
| H04N 5/775 | (2006.01) | |
| H04N 21/422 | (2011.01) | |
| H04N 21/47 | (2011.01) | |

(52) U.S. Cl.
CPC ........... *H04N 7/0884* (2013.01); *H04N 7/165* (2013.01); *H04N 21/2362* (2013.01); *H04N 21/2543* (2013.01); *H04N 21/25883* (2013.01); *H04N 21/25891* (2013.01); *H04N 21/2625* (2013.01); *H04N 21/26266* (2013.01); *H04N 21/4113* (2013.01); *H04N 21/4135* (2013.01); *H04N 21/4143* (2013.01); *H04N 21/4227* (2013.01); *H04N 21/4332* (2013.01); *H04N 21/4334* (2013.01); *H04N 21/4345* (2013.01); *H04N 21/441* (2013.01); *H04N 21/4435* (2013.01); *H04N 21/44222* (2013.01); *H04N 21/458* (2013.01); *H04N 21/4524* (2013.01); *H04N 21/4532* (2013.01); *H04N 21/4622* (2013.01); *H04N 21/4753* (2013.01); *H04N 21/4755* (2013.01); *H04N 21/4782* (2013.01); *H04N 21/4786* (2013.01); *H04N 21/47202* (2013.01); *H04N 21/47211* (2013.01); *H04N 21/47214* (2013.01); *H04N 21/47815* (2013.01); *H04N 21/4821* (2013.01); *H04N 21/4828* (2013.01); *H04N 21/812* (2013.01); *H04N 21/8133* (2013.01); *H04N 21/84* (2013.01); *H04N 21/8586* (2013.01); *H04N 5/45* (2013.01); *H04N 5/775* (2013.01); *H04N 21/42204* (2013.01); *H04N 21/4316* (2013.01); *H04N 21/47* (2013.01)

(58) Field of Classification Search
CPC .. H04N 21/84; H04N 21/4755; H04N 21/812; H04N 21/4622; H04N 21/472; G06F 17/30879; G06F 3/0481; G06F 17/30876; G06K 2017/0045; G06K 7/10851
See application file for complete search history.

(56) References Cited

U.S. PATENT DOCUMENTS

| | | |
|---|---|---|
| 4,170,782 A | 10/1979 | Miller |
| 4,271,532 A | 6/1981 | Wine |
| 4,280,148 A | 7/1981 | Saxena |
| 4,300,040 A | 11/1981 | Gould et al. |
| 4,367,559 A | 1/1983 | Tults |
| 4,375,651 A | 3/1983 | Templin et al. |
| 4,381,522 A | 4/1983 | Lambert |
| 4,385,210 A | 5/1983 | Marquiss |
| 4,390,901 A | 6/1983 | Keiser |
| 4,425,579 A | 1/1984 | Merrell |
| 4,429,385 A | 1/1984 | Cichelli et al. |
| 4,495,654 A | 1/1985 | Deiss |
| 4,527,194 A | 7/1985 | Sirazi |
| 4,605,973 A | 8/1986 | Von Kohorn |
| 4,625,080 A | 11/1986 | Scott |
| 4,641,205 A | 2/1987 | Beyers, Jr. |
| 4,645,873 A | 2/1987 | Chomet |
| 4,677,501 A | 6/1987 | Saltzman et al. |
| 4,689,022 A | 8/1987 | Peers et al. |
| 4,691,351 A | 9/1987 | Hayashi et al. |
| 4,694,490 A | 9/1987 | Harvey et al. |
| 4,706,121 A | 11/1987 | Young |
| 4,751,578 A | 6/1988 | Reiter et al. |
| 4,754,326 A | 6/1988 | Kram et al. |
| 4,761,684 A | 8/1988 | Clark et al. |
| 4,787,063 A | 11/1988 | Muguet |
| 4,882,732 A | 11/1989 | Kaminaga |
| 4,908,707 A | 3/1990 | Kinghorn |
| 4,908,713 A | 3/1990 | Levine |
| 4,959,719 A | 9/1990 | Strubbe et al. |
| 4,963,994 A | 10/1990 | Levine |
| 4,965,825 A | 10/1990 | Harvey et al. |
| 4,977,455 A | 12/1990 | Young |
| 5,016,273 A | 5/1991 | Hoff |
| 5,027,400 A | 6/1991 | Baji et al. |
| 5,036,314 A | 7/1991 | Barillari et al. |
| 5,038,211 A | 8/1991 | Hallenbeck |
| 5,046,092 A | 9/1991 | Walker et al. |
| 5,047,867 A | 9/1991 | Strubbe et al. |
| 5,075,771 A | 12/1991 | Hashimoto |
| 5,089,885 A | 2/1992 | Clark |
| 5,090,049 A | 2/1992 | Chen |
| 5,113,259 A | 5/1992 | Romesburg et al. |
| 5,126,851 A | 6/1992 | Yoshimura et al. |
| 5,132,992 A | 7/1992 | Yurt et al. |
| 5,151,789 A | 9/1992 | Young |
| 5,155,591 A | 10/1992 | Wachob |
| 5,170,388 A | 12/1992 | Endoh |
| 5,179,439 A | 1/1993 | Hashimoto et al. |
| 5,187,589 A | 2/1993 | Kono et al. |
| 5,189,630 A | 2/1993 | Barstow et al. |
| 5,191,423 A | 3/1993 | Yoshida et al. |
| 5,195,134 A | 3/1993 | Inoue et al. |
| 5,210,611 A | 5/1993 | Yee et al. |
| 5,223,924 A | 6/1993 | Strubbe |
| 5,231,494 A | 7/1993 | Wachob |
| 5,233,423 A | 8/1993 | Jernigan et al. |
| 5,253,066 A | 10/1993 | Vogel |
| 5,262,860 A | 11/1993 | Fitzpatrick et al. |

(56) References Cited

U.S. PATENT DOCUMENTS

| | | | |
|---|---|---|---|
| 5,283,819 A | 2/1994 | Glick et al. | |
| 5,293,357 A | 3/1994 | Hallenbeck | |
| 5,296,931 A | 3/1994 | Na | |
| 5,297,204 A | 3/1994 | Levine | |
| 5,317,403 A | 5/1994 | Keenan | |
| 5,323,240 A | 6/1994 | Amano et al. | |
| 5,325,423 A | 6/1994 | Lewis | |
| 5,335,277 A | 8/1994 | Harvey et al. | |
| 5,347,632 A | 9/1994 | Filepp et al. | |
| 5,353,121 A | 10/1994 | Young et al. | |
| 5,359,367 A | 10/1994 | Stockill | |
| 5,371,551 A | 12/1994 | Logan et al. | |
| 5,382,983 A | 1/1995 | Kwoh et al. | |
| 5,396,546 A | 3/1995 | Remillard | |
| 5,398,138 A | 3/1995 | Tomita | |
| 5,410,326 A | 4/1995 | Goldstein | |
| 5,410,344 A | 4/1995 | Graves et al. | |
| 5,410,367 A | 4/1995 | Zahavi et al. | |
| 5,412,720 A | 5/1995 | Hoarty | |
| 5,414,756 A | 5/1995 | Levine | |
| 5,432,561 A | 7/1995 | Strubbe | |
| 5,438,355 A | 8/1995 | Palmer | |
| 5,444,499 A | 8/1995 | Saitoh | |
| 5,446,919 A | 8/1995 | Wilkins | |
| 5,455,570 A | 10/1995 | Cook et al. | |
| 5,457,478 A | 10/1995 | Frank | |
| 5,465,113 A | 11/1995 | Gilboy | |
| 5,465,385 A | 11/1995 | Ohga et al. | |
| 5,469,206 A | 11/1995 | Strubbe et al. | |
| 5,477,262 A | 12/1995 | Banker et al. | |
| 5,479,266 A | 12/1995 | Young et al. | |
| 5,479,268 A | 12/1995 | Young et al. | |
| 5,481,296 A | 1/1996 | Cragun et al. | |
| 5,483,278 A | 1/1996 | Strubbe et al. | |
| 5,488,409 A | 1/1996 | Yuen et al. | |
| 5,502,504 A | 3/1996 | Marshall et al. | |
| 5,515,106 A | 5/1996 | Chaney et al. | |
| 5,515,511 A | 5/1996 | Nguyen et al. | |
| 5,517,254 A | 5/1996 | Monta et al. | |
| 5,517,256 A | 5/1996 | Hashimoto | |
| 5,523,796 A * | 6/1996 | Marshall et al. | 725/41 |
| 5,524,195 A | 6/1996 | Clanton, III et al. | |
| 5,526,034 A | 6/1996 | Hoarty et al. | |
| 5,528,304 A | 6/1996 | Cherrick et al. | |
| 5,534,911 A | 7/1996 | Levitan | |
| 5,543,933 A | 8/1996 | Kang et al. | |
| 5,544,321 A | 8/1996 | Theimer et al. | |
| 5,550,576 A | 8/1996 | Klosterman | |
| 5,550,578 A | 8/1996 | Hoarty et al. | |
| 5,550,863 A | 8/1996 | Yurt et al. | |
| 5,553,221 A | 9/1996 | Reimer et al. | |
| 5,559,548 A | 9/1996 | Davis et al. | |
| 5,559,549 A | 9/1996 | Hendricks et al. | |
| 5,559,550 A | 9/1996 | Mankovitz | |
| 5,561,709 A | 10/1996 | Remillard | |
| 5,563,665 A | 10/1996 | Chang | |
| 5,570,295 A | 10/1996 | Isenberg et al. | |
| 5,572,442 A | 11/1996 | Schulhof et al. | |
| 5,576,755 A | 11/1996 | Davis et al. | |
| 5,579,239 A | 11/1996 | Freeman et al. | |
| 5,583,560 A | 12/1996 | Florin et al. | |
| 5,585,838 A * | 12/1996 | Lawler et al. | 725/54 |
| 5,585,865 A | 12/1996 | Amano et al. | |
| 5,585,866 A | 12/1996 | Miller et al. | |
| 5,589,892 A | 12/1996 | Knee et al. | |
| 5,592,551 A | 1/1997 | Lett et al. | |
| 5,594,490 A | 1/1997 | Dawson et al. | |
| 5,594,509 A * | 1/1997 | Florin et al. | 725/43 |
| 5,594,661 A | 1/1997 | Bruner et al. | |
| 5,596,373 A | 1/1997 | White et al. | |
| 5,596,705 A | 1/1997 | Reimer et al. | |
| 5,600,364 A * | 2/1997 | Hendricks et al. | 725/9 |
| 5,606,374 A | 2/1997 | Bertram | |
| 5,616,876 A | 4/1997 | Cluts | |
| 5,617,526 A | 4/1997 | Oran et al. | |
| 5,617,565 A | 4/1997 | Augenbraun et al. | |
| 5,619,249 A | 4/1997 | Billock et al. | |
| 5,621,456 A | 4/1997 | Florin et al. | |
| 5,623,613 A * | 4/1997 | Rowe et al. | 715/841 |
| 5,625,693 A | 4/1997 | Rohatgi et al. | |
| 5,629,733 A | 5/1997 | Youman et al. | |
| 5,630,119 A | 5/1997 | Aristides et al. | |
| 5,631,995 A | 5/1997 | Weissensteiner et al. | |
| 5,635,978 A | 6/1997 | Alten et al. | |
| 5,635,979 A | 6/1997 | Kostreski et al. | |
| 5,635,989 A | 6/1997 | Rothmuller | |
| 5,640,484 A | 6/1997 | Mankovitz | |
| 5,654,748 A | 8/1997 | Matthews, III | |
| 5,657,072 A | 8/1997 | Aristides et al. | |
| 5,659,742 A * | 8/1997 | Beattie et al. | |
| 5,663,757 A | 9/1997 | Morales | |
| 5,666,293 A | 9/1997 | Metz et al. | |
| 5,666,645 A | 9/1997 | Thomas et al. | |
| 5,671,411 A | 9/1997 | Watts et al. | |
| 5,675,390 A | 10/1997 | Schindler et al. | |
| 5,677,708 A | 10/1997 | Matthews, III et al. | |
| 5,677,981 A | 10/1997 | Kato et al. | |
| 5,682,206 A | 10/1997 | Wehmeyer et al. | |
| 5,682,525 A | 10/1997 | Bouve et al. | |
| 5,684,525 A | 11/1997 | Klosterman | |
| 5,686,954 A | 11/1997 | Yoshinobu et al. | |
| 5,689,663 A | 11/1997 | Williams | |
| 5,691,476 A | 11/1997 | Madaras | |
| 5,692,214 A | 11/1997 | Levine | |
| 5,694,163 A | 12/1997 | Harrison | |
| 5,694,176 A | 12/1997 | Bruette et al. | |
| 5,696,905 A | 12/1997 | Reimer et al. | |
| 5,699,052 A | 12/1997 | Miyahara | |
| 5,699,107 A | 12/1997 | Lawler et al. | |
| 5,699,528 A | 12/1997 | Hogan | |
| 5,708,767 A | 1/1998 | Yeo et al. | |
| 5,708,780 A * | 1/1998 | Levergood et al. | 709/229 |
| 5,710,601 A | 1/1998 | Marshall et al. | |
| 5,710,884 A | 1/1998 | Dedrick | |
| 5,717,923 A | 2/1998 | Dedrick | |
| 5,722,041 A | 2/1998 | Freadman | |
| 5,724,103 A | 3/1998 | Batchelor | |
| 5,724,567 A | 3/1998 | Rose et al. | |
| 5,726,702 A | 3/1998 | Hamaguchi et al. | |
| 5,731,844 A | 3/1998 | Rauch et al. | |
| 5,734,853 A | 3/1998 | Hendricks et al. | |
| 5,734,893 A | 3/1998 | Li et al. | |
| 5,740,549 A * | 4/1998 | Reilly et al. | 705/14.42 |
| 5,742,816 A | 4/1998 | Barr et al. | |
| 5,745,710 A | 4/1998 | Clanton, III et al. | |
| 5,748,191 A | 5/1998 | Rozak et al. | |
| 5,748,716 A | 5/1998 | Levine | |
| 5,749,081 A | 5/1998 | Whiteis | |
| 5,751,282 A | 5/1998 | Girard et al. | |
| 5,752,160 A | 5/1998 | Dunn | |
| 5,754,939 A | 5/1998 | Herz et al. | |
| 5,758,257 A | 5/1998 | Herz et al. | |
| 5,758,259 A | 5/1998 | Lawler | |
| 5,760,821 A | 6/1998 | Ellis et al. | |
| 5,761,372 A | 6/1998 | Yoshinobu et al. | |
| 5,761,606 A | 6/1998 | Wolzien | |
| 5,768,528 A | 6/1998 | Stumm | |
| 5,774,357 A | 6/1998 | Hoffberg et al. | |
| 5,774,664 A | 6/1998 | Hidary et al. | |
| 5,774,859 A * | 6/1998 | Houser et al. | 704/275 |
| 5,778,181 A | 7/1998 | Hidary et al. | |
| 5,781,246 A | 7/1998 | Alten et al. | |
| 5,781,734 A | 7/1998 | Ohno et al. | |
| 5,787,259 A | 7/1998 | Haroun et al. | |
| 5,788,507 A | 8/1998 | Redford et al. | |
| 5,790,201 A | 8/1998 | Antos | |
| 5,790,202 A | 8/1998 | Kummer et al. | |
| 5,790,753 A | 8/1998 | Krishnamoorthy et al. | |
| 5,793,964 A | 8/1998 | Rogers et al. | |
| 5,793,972 A | 8/1998 | Shane et al. | |
| 5,798,785 A | 8/1998 | Hendricks et al. | |
| 5,801,747 A | 9/1998 | Bedard | |
| 5,805,763 A | 9/1998 | Lawler et al. | |
| 5,805,806 A | 9/1998 | McArthur | |

(56) References Cited

U.S. PATENT DOCUMENTS

| | | |
|---|---|---|
| 5,809,214 A | 9/1998 | Nureki et al. |
| 5,809,242 A | 9/1998 | Shaw et al. |
| 5,809,471 A | 9/1998 | Brodsky |
| 5,812,124 A | 9/1998 | Eick et al. |
| 5,812,931 A | 9/1998 | Yuen |
| 5,815,145 A * | 9/1998 | Matthews, III ............... 725/41 |
| 5,818,441 A | 10/1998 | Throckmorton et al. |
| 5,818,511 A | 10/1998 | Farry et al. |
| 5,818,935 A | 10/1998 | Maa |
| 5,819,156 A | 10/1998 | Belmont |
| 5,819,285 A * | 10/1998 | Damico et al. |
| 5,822,123 A | 10/1998 | Davis et al. |
| 5,828,419 A | 10/1998 | Bruette et al. |
| 5,828,420 A | 10/1998 | Marshall et al. |
| 5,828,839 A | 10/1998 | Moncreiff |
| 5,828,945 A | 10/1998 | Klosterman |
| 5,832,223 A | 11/1998 | Hara et al. |
| 5,833,468 A | 11/1998 | Guy et al. |
| 5,835,717 A | 11/1998 | Karlton et al. |
| 5,838,383 A | 11/1998 | Chimoto et al. |
| 5,844,552 A | 12/1998 | Gaughan et al. |
| 5,844,620 A | 12/1998 | Coleman et al. |
| 5,848,396 A | 12/1998 | Gerace |
| 5,850,218 A | 12/1998 | LaJoie et al. |
| 5,852,437 A | 12/1998 | Wugofski et al. |
| 5,861,881 A | 1/1999 | Freeman et al. |
| 5,861,906 A | 1/1999 | Dunn et al. |
| 5,862,292 A | 1/1999 | Kubota et al. |
| 5,867,226 A | 2/1999 | Wehmeyer et al. |
| 5,867,233 A | 2/1999 | Tanaka et al. |
| 5,870,754 A | 2/1999 | Dimitrova et al. |
| 5,873,660 A | 2/1999 | Walsh et al. |
| 5,875,108 A | 2/1999 | Hoffberg et al. |
| 5,877,906 A | 3/1999 | Nagasawa et al. |
| 5,880,720 A | 3/1999 | Iwafune et al. |
| 5,880,768 A * | 3/1999 | Lemmons et al. ............. 725/41 |
| 5,886,732 A | 3/1999 | Humpleman |
| 5,889,950 A | 3/1999 | Kuzma |
| 5,890,138 A | 3/1999 | Godin et al. |
| 5,892,536 A | 4/1999 | Logan et al. |
| 5,892,767 A | 4/1999 | Bell et al. |
| 5,903,314 A | 5/1999 | Niijima et al. |
| 5,903,545 A | 5/1999 | Sabourin et al. |
| 5,903,816 A | 5/1999 | Broadwin et al. |
| 5,905,865 A * | 5/1999 | Palmer et al. ............... 725/112 |
| 5,907,322 A | 5/1999 | Kelly et al. |
| 5,907,323 A | 5/1999 | Lawler et al. |
| 5,912,664 A * | 6/1999 | Eick et al. ................... 715/810 |
| 5,914,712 A * | 6/1999 | Sartain et al. ................. 725/9 |
| 5,914,746 A | 6/1999 | Matthews, III et al. |
| 5,915,026 A | 6/1999 | Mankovitz |
| 5,915,250 A | 6/1999 | Jain et al. |
| 5,923,848 A | 7/1999 | Goodhand et al. |
| 5,929,849 A | 7/1999 | Kikinis |
| 5,929,932 A | 7/1999 | Otsuki et al. |
| 5,931,905 A | 8/1999 | Hashimoto et al. |
| 5,937,160 A | 8/1999 | Davis et al. |
| 5,940,073 A | 8/1999 | Klosterman et al. |
| 5,946,386 A | 8/1999 | Rogers et al. |
| 5,949,954 A | 9/1999 | Young et al. |
| 5,955,988 A | 9/1999 | Blonstein et al. |
| 5,956,716 A * | 9/1999 | Kenner et al. |
| 5,973,683 A | 10/1999 | Cragun et al. |
| 5,977,964 A | 11/1999 | Williams et al. |
| 5,983,236 A * | 11/1999 | Yager et al. |
| 5,987,213 A | 11/1999 | Mankovitz et al. |
| 5,988,078 A | 11/1999 | Levine |
| 5,990,927 A | 11/1999 | Hendricks et al. |
| 5,991,799 A | 11/1999 | Yen et al. |
| 6,002,394 A | 12/1999 | Schein et al. |
| 6,002,443 A | 12/1999 | Iggulden |
| 6,002,444 A | 12/1999 | Marshall et al. |
| 6,003,030 A * | 12/1999 | Kenner et al. |
| 6,005,561 A | 12/1999 | Hawkins et al. |
| 6,005,563 A | 12/1999 | White et al. |
| 6,005,565 A | 12/1999 | Legall et al. |
| 6,005,597 A | 12/1999 | Barrett et al. |
| 6,006,257 A * | 12/1999 | Slezak ......................... 725/110 |
| 6,008,802 A | 12/1999 | Iki et al. |
| 6,008,803 A | 12/1999 | Rowe et al. |
| 6,012,086 A | 1/2000 | Lowell |
| 6,014,184 A | 1/2000 | Knee et al. |
| 6,016,141 A | 1/2000 | Knudson et al. |
| 6,018,372 A | 1/2000 | Etheredge |
| 6,020,883 A | 2/2000 | Herz et al. |
| 6,023,267 A | 2/2000 | Chapuis et al. |
| 6,025,837 A | 2/2000 | Matthews, III et al. |
| 6,029,195 A | 2/2000 | Herz |
| 6,035,091 A | 3/2000 | Kazo |
| 6,058,238 A | 5/2000 | Ng |
| 6,065,047 A | 5/2000 | Carpenter et al. |
| 6,067,561 A | 5/2000 | Dillon |
| 6,072,460 A | 6/2000 | Marshall et al. |
| 6,075,526 A | 6/2000 | Rothmuller |
| 6,081,750 A | 6/2000 | Hoffberg et al. |
| 6,088,722 A | 7/2000 | Herz et al. |
| 6,091,883 A | 7/2000 | Artigalas et al. |
| 6,091,884 A | 7/2000 | Yuen et al. |
| 6,097,441 A | 8/2000 | Allport |
| 6,098,065 A | 8/2000 | Skillen et al. |
| 6,104,334 A | 8/2000 | Allport |
| 6,104,705 A | 8/2000 | Ismail et al. |
| 6,125,230 A | 9/2000 | Yaginuma |
| 6,130,726 A | 10/2000 | Darbee et al. |
| 6,133,909 A | 10/2000 | Schein et al. |
| 6,139,177 A | 10/2000 | Venkatraman et al. |
| 6,151,643 A | 11/2000 | Cheng et al. |
| 6,157,411 A | 12/2000 | Williams et al. |
| 6,163,316 A | 12/2000 | Killian |
| 6,163,345 A | 12/2000 | Noguchi et al. |
| 6,172,674 B1 | 1/2001 | Etheredge |
| 6,177,931 B1 | 1/2001 | Alexander et al. |
| 6,181,335 B1 | 1/2001 | Hendricks et al. |
| 6,184,877 B1 | 2/2001 | Dodson et al. |
| 6,208,384 B1 | 3/2001 | Schultheiss |
| 6,212,553 B1 | 4/2001 | Lee et al. |
| 6,216,264 B1 | 4/2001 | Maze et al. |
| 6,233,734 B1 | 5/2001 | Macrae et al. |
| 6,237,049 B1 | 5/2001 | Ludtke |
| 6,240,555 B1 | 5/2001 | Shoff et al. |
| 6,262,722 B1 | 7/2001 | Allison et al. |
| 6,263,501 B1 | 7/2001 | Schein et al. |
| 6,266,814 B1 | 7/2001 | Lemmons et al. |
| 6,268,849 B1 | 7/2001 | Boyer et al. |
| 6,310,886 B1 | 10/2001 | Barton |
| 6,317,885 B1 | 11/2001 | Fries |
| 6,327,049 B1 | 12/2001 | Ohtsuka |
| 6,331,877 B1 | 12/2001 | Bennington et al. |
| 6,335,963 B1 | 1/2002 | Bosco |
| 6,341,374 B2 | 1/2002 | Schein et al. |
| 6,357,043 B1 | 3/2002 | Ellis et al. |
| 6,359,636 B1 | 3/2002 | Schindler et al. |
| 6,373,528 B1 | 4/2002 | Bennington et al. |
| 6,388,714 B1 | 5/2002 | Schein et al. |
| 6,396,546 B1 | 5/2002 | Alten et al. |
| 6,408,437 B1 | 6/2002 | Hendricks et al. |
| 6,411,696 B1 | 6/2002 | Iverson et al. |
| 6,437,836 B1 | 8/2002 | Huang et al. |
| 6,463,585 B1 | 10/2002 | Hendricks et al. |
| 6,505,348 B1 | 1/2003 | Knowles et al. |
| 6,509,908 B1 | 1/2003 | Croy et al. |
| 6,516,467 B1 | 2/2003 | Schindler et al. |
| 6,526,577 B1 | 2/2003 | Knudson et al. |
| 6,545,722 B1 | 4/2003 | Schultheiss et al. |
| 6,546,399 B1 | 4/2003 | Reed et al. |
| 6,564,378 B1 | 5/2003 | Satterfield et al. |
| 6,611,654 B1 | 8/2003 | Shteyn |
| 6,661,468 B2 | 12/2003 | Alten et al. |
| 6,668,377 B1 | 12/2003 | Dunn |
| 6,675,385 B1 | 1/2004 | Wang |
| 6,675,386 B1 | 1/2004 | Hendricks et al. |
| 6,696,373 B2 * | 2/2004 | Kinn et al. .................... 442/361 |
| 6,732,369 B1 | 5/2004 | Schein et al. |
| 6,742,183 B1 | 5/2004 | Reynolds et al. |

(56) References Cited

U.S. PATENT DOCUMENTS

| | | |
|---|---|---|
| 6,754,904 B1 | 6/2004 | Cooper et al. |
| 6,760,537 B2 | 7/2004 | Mankovitz |
| 6,828,993 B1 | 12/2004 | Hendricks et al. |
| 6,865,746 B1 | 3/2005 | Herrington et al. |
| 6,898,762 B2 | 5/2005 | Ellis et al. |
| 6,925,567 B1 | 8/2005 | Hirata et al. |
| 6,983,483 B2 | 1/2006 | Maze et al. |
| 7,013,478 B1 | 3/2006 | Hendricks et al. |
| 7,047,241 B1 | 5/2006 | Erickson |
| 7,050,988 B2 | 5/2006 | Atcheson et al. |
| 7,058,635 B1 | 6/2006 | Shah-Nazaroff et al. |
| 7,165,098 B1 | 1/2007 | Boyer et al. |
| 7,185,355 B1 | 2/2007 | Ellis et al. |
| 7,187,847 B2 | 3/2007 | Young et al. |
| 7,328,450 B2 | 2/2008 | MacRae et al. |
| 7,349,976 B1 | 3/2008 | Glaser et al. |
| 7,363,645 B1 | 4/2008 | Hendricks |
| 7,437,751 B2 | 10/2008 | Daniels |
| 7,480,929 B2 | 1/2009 | Klosterman et al. |
| 7,493,641 B2 | 2/2009 | Klosterman et al. |
| 7,540,010 B2 | 5/2009 | Hanaya et al. |
| 7,665,109 B2 | 2/2010 | Matthews, III et al. |
| 7,721,307 B2 | 5/2010 | Hendricks et al. |
| 7,757,254 B2 | 7/2010 | Shoff et al. |
| 8,078,751 B2 | 12/2011 | Janik et al. |
| 8,112,776 B2 | 2/2012 | Schein et al. |
| 2002/0026496 A1 | 2/2002 | Boyer et al. |
| 2002/0032907 A1 | 3/2002 | Daniels |
| 2002/0048448 A1 | 4/2002 | Daniels |
| 2002/0059599 A1 | 5/2002 | Schein et al. |
| 2002/0112249 A1 | 8/2002 | Hendricks et al. |
| 2002/0138840 A1 | 9/2002 | Schein et al. |
| 2003/0005445 A1 | 1/2003 | Schein et al. |
| 2003/0031465 A1 | 2/2003 | Blake |
| 2003/0115602 A1 | 6/2003 | Knee et al. |
| 2003/0163813 A1 | 8/2003 | Klosterman et al. |
| 2003/0164858 A1 | 9/2003 | Klosterman et al. |
| 2003/0188310 A1 | 10/2003 | Klosterman et al. |
| 2003/0188311 A1 | 10/2003 | Yuen et al. |
| 2003/0196201 A1 | 10/2003 | Schein et al. |
| 2003/0208756 A1 | 11/2003 | Macrae et al. |
| 2003/0208758 A1 | 11/2003 | Schein et al. |
| 2004/0078815 A1 | 4/2004 | Lemmons et al. |
| 2004/0103439 A1 | 5/2004 | Macrae et al. |
| 2004/0139465 A1 | 7/2004 | Matthews et al. |
| 2004/0210935 A1 | 10/2004 | Schein et al. |
| 2004/0221310 A1 | 11/2004 | Herrington et al. |
| 2005/0015815 A1 | 1/2005 | Shoff et al. |
| 2005/0138660 A1 | 6/2005 | Boyer et al. |
| 2005/0204388 A1 | 9/2005 | Knudson et al. |
| 2005/0229215 A1 | 10/2005 | Schein et al. |
| 2005/0235320 A1 | 10/2005 | Maze et al. |
| 2005/0267819 A1 | 12/2005 | Kaplan |
| 2005/0278741 A1 | 12/2005 | Robarts et al. |
| 2005/0283800 A1 | 12/2005 | Ellis et al. |
| 2006/0037044 A1 | 2/2006 | Daniels |
| 2007/0271582 A1 | 11/2007 | Ellis et al. |
| 2008/0178221 A1 | 7/2008 | Schein et al. |
| 2008/0184308 A1 | 7/2008 | Herrington et al. |
| 2008/0184315 A1 | 7/2008 | Ellis et al. |
| 2008/0184319 A1 | 7/2008 | Mankovitz |
| 2008/0235725 A1 | 9/2008 | Hendricks |
| 2008/0288980 A1 | 11/2008 | Schein et al. |
| 2009/0070817 A1 | 3/2009 | Ellis et al. |
| 2009/0077589 A1 | 3/2009 | Boyer et al. |
| 2010/0115413 A1 | 5/2010 | Schein et al. |
| 2010/0115541 A1 | 5/2010 | Schein et al. |
| 2010/0211969 A1 | 8/2010 | Schein et al. |
| 2010/0211975 A1 | 8/2010 | Boyer et al. |
| 2011/0173660 A1 | 7/2011 | Schein et al. |
| 2011/0258663 A1 | 10/2011 | Lemmons et al. |
| 2012/0079539 A1 | 3/2012 | Schein et al. |
| 2012/0272270 A1 | 10/2012 | Boyer et al. |
| 2013/0304586 A1 | 11/2013 | Angles et al. |

FOREIGN PATENT DOCUMENTS

| | | |
|---|---|---|
| DE | 3640436 A1 | 6/1988 |
| DE | 4201031 A1 | 7/1993 |
| DE | 4217246 A1 | 12/1993 |
| DE | 4240187 | 6/1994 |
| DE | 4407701 A1 | 9/1995 |
| DE | 4440419 A1 | 5/1996 |
| DE | 19 531 121 | 2/1997 |
| DE | 19 740 079 | 3/1999 |
| EP | 0 276425 A2 | 8/1988 |
| EP | 0 339 675 | 11/1989 |
| EP | 0 463 451 | 1/1992 |
| EP | 0617563 A1 | 9/1994 |
| EP | 0 624 04 A2 | 11/1994 |
| EP | 0 644 689 | 3/1995 |
| EP | 0 650 114 | 4/1995 |
| EP | 0 658 048 | 6/1995 |
| EP | 0 682 452 | 11/1995 |
| EP | 0 705 036 | 4/1996 |
| EP | 0 723369 A1 | 7/1996 |
| EP | 0721253 A2 | 7/1996 |
| EP | 0725539 A2 | 8/1996 |
| EP | 0 742669 | 11/1996 |
| EP | 0 774 853 | 5/1997 |
| EP | 0774866 A2 | 5/1997 |
| EP | 0 793 225 | 9/1997 |
| EP | 0805594 A2 | 11/1997 |
| EP | 0 837599 A2 | 4/1998 |
| EP | 0 852361 A2 | 7/1998 |
| EP | 0854645 A2 | 7/1998 |
| GB | 1 554 411 | 10/1979 |
| GB | 2265792 | 10/1993 |
| GB | 2325537 A | 11/1998 |
| JP | 62-060372 | 3/1987 |
| JP | 63-092177 A | 4/1988 |
| JP | 10-42235 A | 2/1989 |
| JP | 10-93933 A | 4/1989 |
| JP | 03-022770 | 1/1991 |
| JP | 04079053 | 3/1992 |
| JP | 04227380 | 8/1992 |
| JP | 05260400 A | 10/1993 |
| JP | 05-314186 | 11/1993 |
| JP | 06021907 | 1/1994 |
| JP | 06038165 | 2/1994 |
| JP | 06-124309 | 5/1994 |
| JP | 06504165 | 5/1994 |
| JP | 06-217271 | 8/1994 |
| JP | 06243539 | 9/1994 |
| JP | 06-350546 | 12/1994 |
| JP | 07-021619 | 1/1995 |
| JP | 07-135621 A | 5/1995 |
| JP | 07123326 | 5/1995 |
| JP | 07-162776 | 6/1995 |
| JP | 07147657 A | 6/1995 |
| JP | 07154349 A | 6/1995 |
| JP | 07160732 | 6/1995 |
| JP | 07184131 A | 7/1995 |
| JP | 07193762 A | 7/1995 |
| JP | 07193763 A | 7/1995 |
| JP | 07-212732 | 8/1995 |
| JP | 0720254 | 11/1995 |
| JP | 08-32528 | 2/1996 |
| JP | 08-056352 | 2/1996 |
| JP | 08032538 | 2/1996 |
| JP | 08125497 | 5/1996 |
| JP | 08506941 | 7/1996 |
| JP | 08251122 | 9/1996 |
| JP | 08275077 | 10/1996 |
| JP | 09-009245 | 1/1997 |
| JP | 09-070020 | 3/1997 |
| JP | 09-102827 A | 4/1997 |
| JP | 09-162821 | 6/1997 |
| WO | WO-86/01359 A1 | 2/1986 |
| WO | WO-87/03766 | 6/1987 |
| WO | WO-89/03085 | 4/1989 |
| WO | WO-94/13107 | 6/1994 |
| WO | WO-94/14282 A1 | 6/1994 |
| WO | WO-94/14284 A1 | 6/1994 |

(56) References Cited

FOREIGN PATENT DOCUMENTS

| WO | WO-95/10910 | 4/1995 |
|---|---|---|
| WO | WO-95/15658 A1 | 6/1995 |
| WO | WO-9515657 A1 | 6/1995 |
| WO | WO-95/19092 A1 | 7/1995 |
| WO | WO 95/26095 | 9/1995 |
| WO | WO-95/26608 A1 | 10/1995 |
| WO | WO-95/28799 A1 | 10/1995 |
| WO | WO-95/32585 | 11/1995 |
| WO | WO-9532583 A1 | 11/1995 |
| WO | WO 95/33338 | 12/1995 |
| WO | WO-9613013 A1 | 5/1996 |
| WO | WO-9621990 A2 | 7/1996 |
| WO | WO-9627989 | 9/1996 |
| WO | WO 96/37983 | 11/1996 |
| WO | WO-9637996 A1 | 11/1996 |
| WO | WO-9638962 | 12/1996 |
| WO | WO-97/36422 | 10/1997 |
| WO | WO-97/47106 | 12/1997 |
| WO | WO-97/47143 | 12/1997 |
| WO | WO-9745786 | 12/1997 |
| WO | WO-98/16062 | 4/1998 |
| WO | WO-98/17063 A1 | 4/1998 |
| WO | WO-9821664 A1 | 5/1998 |
| WO | WO-9821877 | 5/1998 |
| WO | WO-98/56173 A1 | 12/1998 |
| WO | WO-98/56176 A1 | 12/1998 |
| WO | WO-99/01984 A1 | 1/1999 |
| WO | WO-99/04570 | 1/1999 |
| WO | WO 2005/027512 | 3/2005 |

OTHER PUBLICATIONS

"Presenting Java," John Dec., Sams.net Publishing, published Sep. 20. 1995.
"TV Guide going online," Broadcasting & Cable, pp. 49-52 (Jun. 13, 1994).
"TV Listing Star on the Computer," Eckoff, J.,Central Penn Business Journal, High Beam Research (Mar. 15, 1996).
ACM Multimedia 93 Proceedings, "A Digital On-Demand Video Service Supporting Content-Based Queries," Little et al. pp. 427-436, Jul. 1993.
Armstrong, L., "Channel-Surfing's next wave: Henry Yuen's interactive TV guide takes on TCI and Viacom," BusinessWeek, Jul. 31, 1995.
Arnold, W.F., "Britain to get wired city—via telephone," Electronics, Mar. 4, 1976, at 76.
Blahut et al., "Interactive Television," Proceedings of the IEEE, Jul. 1995.
Boyd-Merritt, R., "Television wires two-way video," Electronic Engineering Times, Apr. 25, 1994.
Brugliera, "Digital On-Screen Display—A New Technology for the Consumer Interface," *Symposium Record Cable Sessions*, 18th International Television Symposium and Technical Exhibition, Montreux, Switzerland Jun. 10-15, 1993, pp. 572-586 (Jun. 11, 1993).
Compton et al., "Internet CNN Newsroom: a digital video news magazine and library," Proc. of the Intl. Conf. on Multimedia Computing and Systems. Washington, May 15-18, 1995; [Proceedings of the International Conference on Multimedia Computing and Systems], Los Alamitos, IEEE Comp. Soc. Press, US, May 15, 1995 (May 15, 1995), pp. 296-301, XP010154611.
Day, R., "The Great PC/TV Debate," OEM Magazine, Jul. 1, 1996.
Defence and Counterclaim of the First and Second Defendants, No. HC11 C 04556, between Starsight Telecast and United Video Properties (Claimants) and Virgin Media, Virgin Media Payments, and TiVo Defendants (pp. 10-11) (Mar. 14, 2012).
Dial M for Movie, Funkschau Nov. 1994, Perspektiven, Video on Demand, pp. 78-79. (English language translation attached.).
Dialing the printed page, ITT in Europe Profile, 11/Spring 1977.
DIRECTV Plus2 System, Thompson Consumer Electronics, Inc. (1999).

DiRosa, S., "BIGSURF Netguide," Jul. 1995, vol. 3.1 (Sections 18, 21, and 28—renumbered as pp. 1-27).
Eitz, Gerhard, "Zuünftige Informations—Und Datenangebote Beim Digitalen Fernsehen—EPG Und "Lesezeichen"," Rundfunktechnische Mitteilungen, vol. 41, pp. 67-72, Jun. 1997.
Electronic Program Guide via Internet, Research Disclosure, Kenneth Mason Publications, Hampshire, GB Nr. 385 (May 1996) p. 276, ISSN:0374-4353.
Growing US interest in the impact of viewdata, Computing Weekly, Jul. 20, 1978.
Hauptmann et al., "News on Demand," News-on-Demand: An Application Informedia® Technology D-Lib Magazine, (Sep. 13, 1995), XP002675162, Retrieved from the Internet: URL:http://www.dlib.org/dlib/september95/nod/page3/html[retrieved on May 2, 2012].
Hobbes Internet Timeline, Mar. 22, 2007.
Holland, G. L., "NAPLPS standard defines graphics and text communications," EDN, Jan. 10, 1985, at 179.
Honey, is there anything good on the remote tonight?, advertisement from Multichannel News, Broadband Week Section, p. 168, Nov. 30, 1998.
How Evolve Works, from the Internet at http://www.evolveproducts.com/network.html, printed on Dec. 28, 1998.
Iizuka et al., Building Internet TV Guide Service 1 and 2, the 53rd National Conference Proceedings, Japan, Information Processing Society of Japan, Sep. 6, 1996 p. 3-227 to 230. (English).
Instruction Manual *Using StarSight 2*, StarSight Telecast, Inc., 1994.
Kai et al., "Development of a Simulation System for Integrated Services Television," Report from Information Processing Society of Japan, Japan, Sep. 13, 1996, vol. 96, No. 90 p. 13-20.
Keith Lynch's timeline of net related terms and concepts, Mar. 22, 2007.
Large, P., "Throw away the books13 Viewdata's coming," Guardian, Jan. 10, 1978.
Large, P., "Viewdata, the invention that brings boundless advice and information to the home, also sets a test for the Post Office," Financial Guardian, Jun. 29, 1978.
Leftwich et al., *StarSight Interactive Television Program Guide, Phase III*, Functional/Interactional Architecture Specification Document, Orbit Interaction, Palo Alto, California.
Leftwich et al., *StarSight Interactive Television Program Guide, Phase IV*, Functional/Interactional Architecture Specification Document, Orbit Interaction, Palo Alto, California, published before Apr. 19, 1995.
Lists> What's on Tonite TV Listings Internet Article, [Online], Jan. 28, 1995, XP002378869 Retrieved from the Internet: URL: www.scout.wisc.edu/Projects/PastProjects/NH/95-01-31/0018.html> [retrieved on Apr. 28, 2006] *the whole document*.
Lloyd, J., "Impact of technology," Financial Times, Jul. 1978.
Miller, M.D., "A Scenario for the Deployment of Interactive Multimedia Cable Television Systems in the United States in the 1990s," IEEE, 1994.
Money, S.A., "Teletext and Viewdata," Butterworth & Co. Ltd., London, 1979.
Mosley, J.D., "NAPLPS chip sets, though scarce, satisfy limited US videotex demand," EDN, Mar. 21, 1985, at 57.
Neue, Digitale Strategien Bericht Von Den 5. Dermastaedter Fernsehtagen, FKT Fernseh Und Kinotechnik, vo. 49, No. 3, Mar. 1, 1995, pp. 135-139, XP000507348, Fachverlag Schiele & Schon GMBH., Berlin, DE ISSN: 140-9947.
Neumann, Andreas, "WDR Online Aufbau Und Perspektiven Automatisierter Online-Dienste Im WDR," Rundfunktechnische Mitteilungen, vol. 41, pp. 56-66, Jun. 1997.
Open TV fur interaktives Fernsehen, Trend & Technik, 9-95 RFE, p. 100. (English language translation attached.).
Owen, K., "How dial-a-fact is coming closer to home," The Times, Sep. 30, 1977.
Owen, K., "Why the Post Office is so excited by its plans for a TV screen information service," The Times, Sep. 26, 1976.
Poole, J., "Demand for Viewdata grows," Sunday Times, Feb. 10, 1977.
Printout from Google News Archives, Mar. 22, 2007.

(56) References Cited

OTHER PUBLICATIONS

Prodigy Launches Interactive TV Listing, Apr. 22, 1994, Public Broadcasting Report.
Qayyum, H., "Using IVDS and VBI for Interactive Television," IEEE, Jun. 10, 1996.
Rajapakshe et al., "Video on demand," (last modified Jun. 1995) <http://www-dse.doc.ic.ac.uk/~nd/suprise_95 /Journal/vo14/shr/report.html>.
Rath et al., "Set-Top Box Control Software: A Key Component in Digital Video," Philips Journal of Research, vol. 50, No. ½, 1996, at 185.
Reaching your subscribers is a complex and costly process-until now, from the Internet at http://www.evolveproducts.com/info.html, printed on Dec. 28, 1998.
Rogers, C., "Telcos vs. Cable TV: The Global View," Data Communications, vol. 13, pp. 75-80 (Sep. 21, 1995).
Rosch, G. D., "New data and information system set for commercial market trial," Telephony, Mar. 20, 1978, at 96.
Ruffler et al., "InfoRadio on Demand, WebTV and digiTaz—Telecommerce Case Studies," May 23, 1996.
Ryan, M., "Interactive TV Takes a Corporate Twist," Electronic Engineering Times, Jul. 10, 1995.
Schauer, Tom: Internet Article, [Online] Sep. 28, 1995 (Sep. 28, 1995), XP002378870, Retrieved from the Internet: URL: www.vision2020.moscow.com/Archives/1995/9509/0058.htlm> [retrieved on Apr. 28, 2006] *the whole document*.
Schmuckler, Eric, "A marriage that's made in cyberspace (television networks pursue links with online information services)," May 16, 1994, Mediaweek, v4, n20, p22 (3).
Selected pages from the "BBC Online—Schedules" web page. This web page is located at http://www.bbc.co.uk/schedules/ (as printed from the Internet on Oct. 19, 1999 and being dated as early as May 24, 1997).
Sharpless et al., "An advanced home terminal for interactive data communication," Conf. Rec. Int. Conf. Commun. ICC '77, IEEE, Jun. 12-15, 1977, at 19.6-47.
St. John Sandringham, "Dress rehearsal for the Prestel show," New Scientist, Jun. 1, 1978, at 586.
Statement in an Examination Report dated Aug. 2, 1999 for a counterpart foreign application filed in New Zealand in which the foreign Examiner alleges that he has used "The Internet to access television listings for BBC World television as far back as mid 1996 . . . ".
Stickland, D.C., Its a common noun, The Economist, Jun. 5, 1978.
Stokes, A., "The viewdata age: Power to the People," Computing Weekly, Jan. 1979.
Sun's Next Steps in Digital Set-Tops, article in Cablevision, p. 56, Nov. 16, 1998.
Teletext presents the alternative view, Financial Times, Oct. 24, 1977.
The clickTV television program guide website of TVData of Queensbury, New York. This website is located at www.clicktv.com (as printed from the Internet on Aug. 13, 1997).
The Evolve EZ Guide. The Remote Control, from the Internet at http://www.evolveproducts.com/display2.html, printed on Dec. 28, 1998.
The InfoBeat television program guide website of InfoBeat, Inc. This website is located at www.infobeat.com (as printed from the Internet on Dec. 8, 1997).
The television program guide website of Gist Communications, Inc. of New York, New York. This website is located at www.gist.com (as printed from the Internet on Aug. 14, 1997).
The television program guide website of TV Guide Entertainment Network. This website is located at www.tvguide.com (as printed from the Internet on Aug. 14-22, 1997).
Three men on a Viewdata bike, The Economist, Mar. 25, 1978.
TV Guide movie database Internet web pages printed on Aug. 12, 1999 (9 pages).
TV Guide Online Set for Fall, Entertainment Marketing Letter, Aug. 1994.

UVSG Offers System-Specific Web Site Development for OPS, press release of United Video Satellite Group, Apr. 12, 1996.
UVSG Teams With Microsoft on Internet Information Server, press release of United Video Satellite Group, Feb. 22, 1996.
VideoGuide, Videoguide Users Manual, pp. 1-27.
Viewdata and its potential impact in the USA: Final Report/vol. One, The UK Experience, Link and Butler Cox & Partners Limited, Oct. 1978.
Viewdata moves in US but GEC may lose out, Computing Weekly, Jan. 25, 1978.
Viewdata Service Terminal Specification, British Post Office, Issue 5, Aug. 1978.
Waldo, Jim, "JiniTM Architecture Overview," from the Internet at http://Java.sun.com/products/jini/whitepapers/architectureoverview.pdf/ printed on Jan. 25, 1999. The document bears a copyright date of 1998.
Web TV and Its Consumer Electronics Licensees Debut First Internet Television Network and Set-Top Box, Jul. 10, 1996 <http://www.ohlfs.com/keith/self/webtv/home/HTML/home.license.html>.
What is Jini?, from the Internet at http://java.sun.com/products/jini/whitepapers/whatsjini.pdf, printed on Jan. 25, 1999.
Whitehorn, K., "Viewdata and you," Observer, Jul. 30, 1978.
Why Jini Now?, from the internet at http://java.sun.com/products/jini/whitepapers/whyjininow.pdf, printed on Jan. 25, 1999. The document bears a copyright date of 1998.
Wikipedia article on CompuServe, Mar. 22, 2007.
Wittig, H. et al., Intelligent Media Agents in Interactive Television Systems Proceedings of the International Conference on Multimedia Computing and Systems, Los Alamitos, CA, US, May 15, 1995 (May 15, 1995),—May 18, 1995, (May 18, 1995) pp. 182-189, XP00603484 p. 183, left hand column, paragraph 2, p. 184, right-hand column, paragraph 2 figure 4.
Yoshida, J., "Interactive TV a Blur," Electronic Engineering Times, Jan. 30, 1995.
"A Wonderworld of Services," The Sunday Times, Innovation section, p. 4, Jan. 7, 1996.
Ryan, K., "Free Interactive TV Guide," Google Newsgroup, Alleged Date Sep. 29, 1995.
"Step Up to the Superhighway," The Sunday Times, Innovation section, p. 6, Jan. 7, 1996.
"Yearling's Free Personalised TV Guide," from the internet at http://www.yearling.com/, Dec. 30, 1996.
Williams, David M., and Perry, Burt, "Rich Online Services as the Archetype for Interactive TV," Cable '94, Proceedings from Twelve Technical Sessions, 43rd Annual Convention and Exposition of the National Cable Television Association, May 22-25, 1994, New Orleans, LA., Technical Paper Compiled by Katherine Rutkowski, National Cable, XP008161201, pp. 21-35.
"Columbia House CD-ROM Direct: Detail Page," accessed from the internet at http://web.archive.org/web/19961221160255/http://www.columbiahouse.com/cd/cgis . . . , copyright 1996, printed on Sep. 19, 2013.
"Columbia House CD-ROM Direct: Download Demos!," accessed from the internet at http://web.archive.org/web/19961221095819/http://www.columbiahouse.com/cd/cgis . . . , copyright 1996, printed on Sep. 19, 2013.
"Columbia House CD-ROM Direct: Member Center," accessed from the internet at http://web.archive.org/web/19961221085905/http://www.columbiahouse.com/repl/cd/ . . . , copyright 1996, printed on Sep. 19, 2013.
"Columbia House CD-ROM Direct: Member Center," copyright 1996.
"Columbia House CD-ROM Direct: The Connection," accessed from the internet at http://web.archive.org/web/19961221100721/http://www.columbiahouse.com/repl/cd/ . . . , copyright 1996, printed on Sep. 20, 2013.
"Columbia House CD-ROM Direct: The Connection," accessed from the internet at http://web.archive.org/web/19961223152924/http://www.columbiahouse.com/repl/cd/ . . . , copyright 1996, printed on Sep. 20, 2013.

(56) References Cited

OTHER PUBLICATIONS

"Columbia House Laser Disc Club: FAQ Answers," accessed from the internet at http://web.archive.org/web/19961223165516/http://www.columbiahouse.com/repl/lc/t . . . , copyright 1996, printed on Sep. 20, 2013.
"Columbia House Laser Disc Club: Join the Club," accessed from the internet at http://web.archive.org/web/19961221094037/http://www.columbiahouse.com/repl/lc/t . . . , copyright 1996, printed on Sep. 20, 2013.
"Columbia House Music Club: Join the Club," accessed from the internet at http://web.archive.org/web/19961221091101/http://www.columbiahouse.com/repl/mc . . . , copyright 1996, printed on Sep. 20, 2013.
"Columbia House Music Club: Search," accessed from the internet at http://web.archive.org/web/19961221114653/http://www.columbiahouse.com/repl/mc . . . , copyright 1996, printed on Sep. 19, 2013.
"Columbia House Music Club: Shopping Cart," accessed from the internet at http://web.archive.org/web/19961221120941/http://www.columbiahouse.com/mc/cgis . . . , copyright 1996, printed on Sep. 19, 2013.
"Columbia House Video Club: Essential Collection," accessed from the internet at http://web.archive.org/web/199612211131908/http://www.columbiahouse.com/vc/cgis/j . . . , copyright 1996, printed on Sep. 20, 2013.
"Does NBC Get It," Aug. 14, 1995, retrieved from the internet at http://www.open4success.org/db/bin19/019687.html, retrieved on Dec. 11, 2013.
Draft Grounds of Invalidity for EP (UK) 0 880 856 (Trial B), No. HC11 C 04556, between Starsight Telecast and United Video Properties (Claimants) and Virgin Media, Virgin Media Payments, and TiVo (Defendants), 7 pgs., Oct. 2013.
"GameSpot: Allied General—Download It Now!!!!," accessed from the internet at http://web.archive.org/web/19970206133452/http://www.gamespot.com/strat egy/allie . . . , copyright 1997, printed on Sep. 19, 2013.
"GameSpot: Allied General at a Glance," accessed from the internet at http://web.archive.org/web/19970205153530/http://www.gamespot.com/strat egy/allie . . . , copyright 1996, printed on Sep. 19, 2013.
"GameSpot's Downloads for Allied General," accessed from the internet at http://web.archive.org/web/19970205060703/http://www.gamespot.com/strat egy/allie . . . , copyright 1997, printed on Sep. 19, 2013.
"Gateway Destination: The PC for the Office and the Family Room," PC Magazine, First Looks section, pp. 39-41, Jun. 11, 1996.
"The Columbia House Video Club: Download Software," accessed from the internet at http://web.archive.org/web/19961223163101/http://www.columbiahouse.com/repl/vc . . . , copyright 1996, printed on Sep. 19, 2013.
"Today's Stop: What's on Tonite," Oct. 3, 1995, retrieved from the internet at http://internettourbus.com/arch/1995/TB100395.TXT, retrieved on Dec. 9, 2013.
"Welcome to Columbia House Online," accessed from the internet at http://web.archive.org/web/19961221085121/http://www.columbiahouse.com/, copyright 1996, printed on Sep. 19, 2013.
"What's on Tonite!," Jan. 28, 1995, retrieved from the internet at http://www.library.georgetown.edu/newjour/publication/whats-tonite-tm, retrieved on Dec. 11, 2013.
Chen et al., "Real Time Video and Audio in the World Wide Web," Proc. 4th World Wide Web Conference, 1995.
Dr. Dobb's, "Implementing a Web Shopping Cart," from the internet at http://www.drdobbs.com/article/print?articleId=184409959&siteSect . . . , Sep. 1, 1996, printed from the internet on Sep. 13, 2012.
Fry et al., "Delivering QoS Controlled Continuous Media on the World Wide Web," Proceedings of the 4th International IFIP Workshop on QoS, Paris, Mar. 6-8, 1996, 12 pgs.

Harada, Mamoru et al., "Internet de telebi housou ga hajimaru," ("Television Broadcasting Starts with the Internet"), Nikkei Electronics, Japan, Nikkei BP, No. 653, Jan. 15, 1996, pp. 67-75. (Concise Explanation included in IDS letter.).
"Hobbes' Internet Timeline 10.2," by Robert H'obbes' Zakon, from the internet at http://www.zakon.org/robert/internet/timeline/, printed from the internet on Sep. 13, 2012.
Ikejiri, Minoru et al., "Maruchimedia wo riido suru apurikeishon kaihatu," ("Application Development for Leading Multimedia"), Journal of NTT Technologies, Japan, The Telecommunications Association of Japan, vol. 7, No. 9, Sep. 1, 1995, pp. 48-55. (Concise Explanation included in IDS letter.).
"Internet User Forecast by Country," Computer Industry Almanac-Press Release, from the internet at http://www.c-i-a.com/internetusersexec.html, printed from the internet on Sep. 13, 2012.
Little et al., "Prospects for Interactive Video-on-Demand," IEEE Multimedia, Fall 1994, pp. 14-24.
Loen et al., "Subscriber Terminal Units for Video Dial Tone Systems," IEEE Network, Sep./Oct. 1995, pp. 48-57.
Okimi, Katsuya et al., "Shinban ISDN," ("New ISDN Edition"), Japan, Ohmsha, Ltd., First Edition, Oct. 5, 1995, pp. 261-285. (Concise Explanation included in IDS letter.).
"Prevue Channel Sep. 1, 1995 (part 1)," PrevueGuide, from the internet at http://www.youtube.com/watch?v=OVu178nH6RY, retrieved on Nov. 26, 2013, 1 pg.
Savage, "Internet's 'What's on Tonite!' Tells You Just That and More," The News, InfoWatch, May 29, 1995.
Wikipedia article, "Geschichte des Internets," from the internet at http://de.wikipedia.org/wiki/Geschichte_des_Internets, page last modified on Apr. 28, 2012, printed from the internet on May 18, 2012. (Concise explanation included in IDS letter.).
Wikipedia article, "Internet Explorer," from the internet at http://de.wikipedia.org/wiki/Internet_Explorer, page last modified on Sep. 9, 2012, printed from the internet on Sep. 13, 2012. (Concise explanation included in IDS letter.).
Wikipedia article, "MSN TV," from the internet at http://en.wikipedia.org/wiki/MSN_TV, page last modified on May 15, 2012, printed from the internet on Sep. 13, 2012.
Wikipedia article, "NCSA Mosaic," from the internet at http://de.wikipedia.org/wiki/NCSA_Mosaic, page last modified on Sep. 3, 2012, printed from the internet on Sep. 13, 2012. (Concise explanation included in IDS letter.).
"A Financial Times Survey: Viewdata (Advertisement)," Financial Times, Mar. 20, 1979.
Buchholz et al., "Revolution auf dem Bildschirm—Die neuen Medien Videotext and Bildschirmtext," Wilhelm Goldmann Verlag, Munich, Germany, copyright 1979, pp. 24-33 and 36-39. (Concise explanation included in IDS letter.).
Karunanithi et al., "A Feature-Based Neural Network Movie Selection Approach," Proc. Intl. Workshop on Applications of Neural Networks to Telecommunications, Stockholm, Sweden, May 22-24, 1995, pp. 162-169.
Katkere et al., "Interactive Video on WWW: Beyond VCR-like Interfaces," Computer Networks and ISDN Systems, vol. 28, Issue 11, 1996, pp. 1559-1572.
Khoo et al., "An Expert System Approach to Online Catalog Subject Searching," Information Processing & Management: An International Journal, vol. 30, No. 2, 1994, pp. 223-238.
Melton, "The Uniden Super 4800," OnSat magazine, Jun. 10-Jun. 16, 1990, pp. 2-4.
Personal Entertainment Guide—Users Guide, Version 1.0, Copyright 1991 by Lookahead Communications Inc.
SuperGuide/Uniden 4800, "A Quick Guide to Programming the Uniden 4800—Dealer Set-Up Manual," undated, 8 pages.
SuperGuide/Uniden 4800, "A Users Guide to SuperGuide's™ Features," undated, 12 pages.
Uniden®, UST-4800, Integrated Receiver/Descrambler, Installation Guide, copyright 1990, 60 pages.
Uniden®, UST-4800, Integrated Receiver/Descrambler, Operating Guide, copyright 1990, 24 pages.

(56) References Cited

OTHER PUBLICATIONS

Uniden®, UST-4800 Super, Integrated Receiver/Descrambler, Preliminary Reference Manual, Nov. 12, 1991, 80 pages.
Whale, "Identification of Program Similarity in Large Populations," The Computer Journal, vol. 33, No. 2, 1990, pp. 140-146.

* cited by examiner

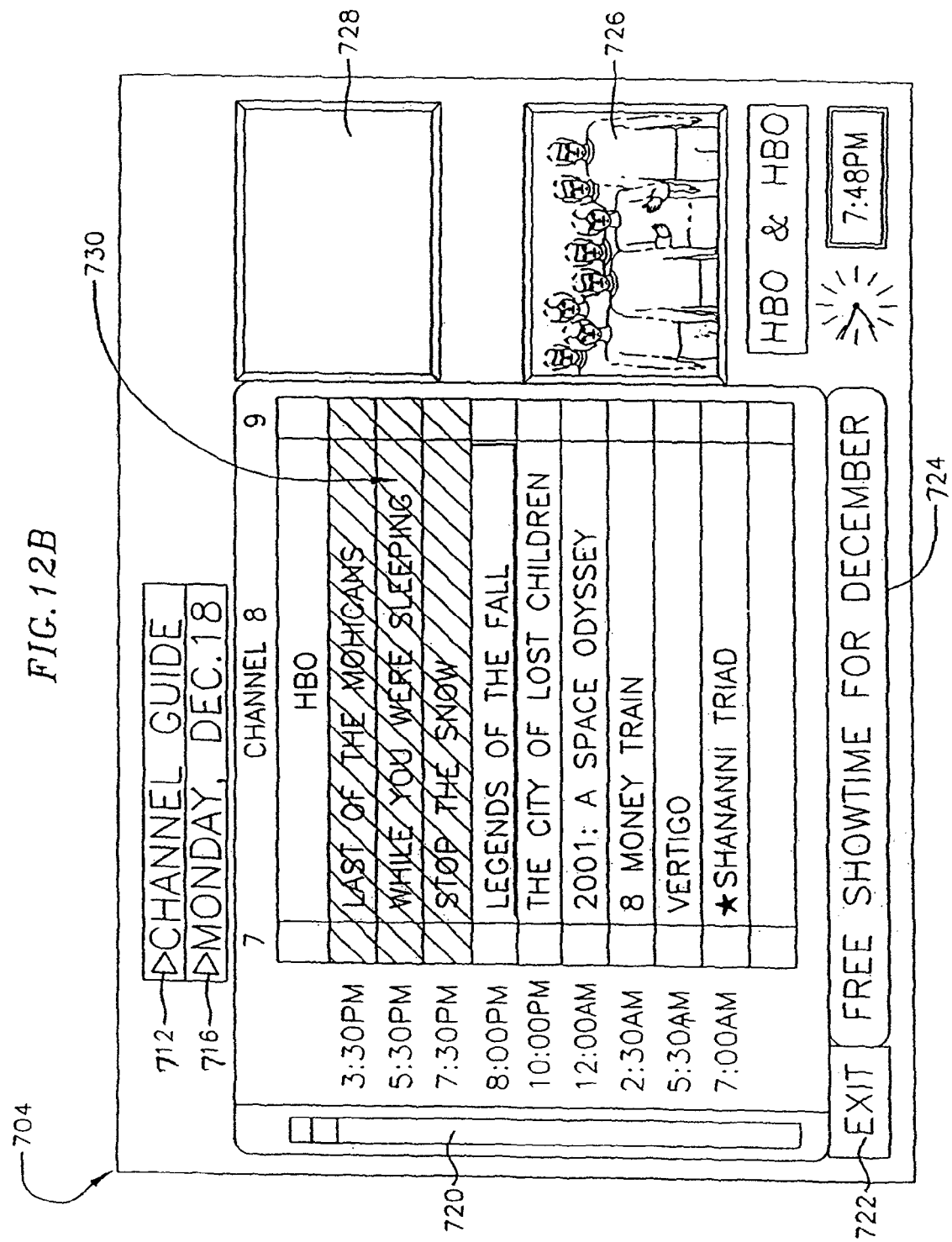

*FIG. 17D*

```
ENTERING PASSWORD
BY ENTERING YOUR PASSWORD YOU ARE CONFIRMING
A PURCHASE OR VALIDATION OF YOUR ID.
PLEASE ENTER YOUR PASSWORD TO ORDER THIS
ITEM FOR THE LISTED PURCHASE PRICE.
HELP: PASSWORD
(1) INFO ON (OFFICIAL NFL CAP)          $9.95
  ┌─────────────────────────────────────┐
  │ ENTER PASSWORD FOR DELIVERY VIA U.P.S.│
  │ OFFICIAL NFL CAP-WA REDSKINS-$9.95   │
  │   ┌─ • • • • • • • • • • • ─┐       │
  │                                       │
  │ (2) ACCEPT PASSWORD...                │
  │ (<) BACK TO PREVIOUS MENU             │
  └─────────────────────────────────────┘
(0) GO BACK TO PROGRAM GUIDE
```

*FIG. 17E*

```
HELP: CONFIRMING YOUR PURCHASE
(1) INFO ON (OFFICIAL NFL CAP)          $9.95
  ┌─────────────────────────────────────┐
  │ YOU HAVE SUCCESSFULLY ENTERED YOUR   │
  │ PASSWORD. ARE YOU SURE YOU WANT TO   │
  │ PROCEED TO FINALIZE YOUR ORDER ?     │
  │                                       │
  │ (2) YES                               │
  │ (<) NO (BACK TO PREVIOUS MENU)        │
  └─────────────────────────────────────┘
(0) GO BACK TO PROGRAM GUIDE
```

*FIG. 17F*

```
OFFICIAL NFL CAP
A GOOD-LOOKING ACCESSORY FOR ANY FAN. YOUR
FAVORITE NFL TEAM LOGO EMBROIDERED ON A
TOP-QUALITY ALL-COTTON CAP. COMES IN TEAM COLORS.
                          SPECIAL OFFER-$9.95
SPORTS: FOOTBALL
(1) MORE INFORMATION
  ┌─────────────────────────────────────┐
  │         YOUR ORDER CONFIRMED !       │
  │   12.15.95   OR.#950384271  IT.#3452NP│
  │   ACCOUNT 234.95430   PURCHASE: $9.95 │
  │   (2) OK (BACK TO PREVIOUS MENU)      │
  │   (3) GO TO YOUR LIST OF PURCHASES    │
  └─────────────────────────────────────┘
(0) GO BACK TO PROGRAM GUIDE
```

INTERACTIVE COMPUTER SYSTEM FOR PROVIDING TELEVISION SCHEDULE INFORMATION

CROSS-REFERENCE TO RELATED APPLICATION

This is a divisional of U.S. patent application Ser. No. 11/147,802, filed Jun. 7, 2005, which is a continuation of U.S. patent application Ser. No. 10/047,127, filed Jan. 14, 2002, now abandoned, which is a continuation of U.S. patent application Ser. No. 08/837,025, filed Apr. 11, 1997, now U.S. Pat. No. 6,388,714, which is continuation in part of claims the benefit of U.S. Provisional Patent Application Nos. 60/022,826, filed on Jul. 26, 1996, and 60/015,648, filed on Apr. 19, 1996, and which is a continuation-in-part of U.S. patent application Ser. No. 08/537,650, filed Oct. 2, 1995, the complete disclosures of which are incorporated herein by reference.

BACKGROUND OF THE INVENTION

The present invention generally relates to systems and methods for providing information to television viewers, and more particularly to systems and methods for allowing the viewer to retrieve, initiate a subscription to, search, select and interact with television schedule and/or listing information located in a remote database, computer network or on-line service, e.g., a network server on the Internet or World Wide Web.

As the number of television stations in a metropolitan area or on a cable network has increased, the number of programs of potential interest that are presented to a viewer has risen dramatically. With the use of dish antennas capable of receiving direct satellite signals, the multitude of programs available to the viewer has further increased. Consequently, television schedule systems that are provided directly on the viewer's television screen have been developed to assist the viewer in sorting through these various programs and determining which programs to watch or, record. One such television schedule system is disclosed in commonly assigned U.S. Pat. No. 5,353,121 (Young et al.), the complete disclosure of which is hereby incorporated by reference. In one embodiment of Young, the television schedule includes a series of menu screens having an array of cells corresponding to different television programs. The viewer may scroll through the cells to view which television programs are being presented on various channels at various times. In addition, the viewer may select certain cells to obtain more information on the associated program or to pull up other submenus with additional options.

The recent development of television schedule systems, such as the above described patent to Young, have created many new challenges and opportunities. One such challenge and opportunity is to provide viewers with additional information associated with a particular program in the television guide. As a television viewer is browsing through the television programs, he or she may wish to obtain more information relating to specific areas of interest or concerns associated with the show, such as the actors, actresses, other movies released during the same time period, or travel packages or promotions that may be available through primary, secondary or third party vendors. Offering this type of information to the television viewer can be difficult, however, because there are currently hundreds of different programs broadcast every day and eventually there will be an unlimited number of programs available, both current and digitally archived. In addition, the available information changes at a rapid pace, which makes it even more difficult to provide this information in present television schedule guides.

In television broadcasting, it may also be desirable to interact with the viewer. There are many commercials and programs which request viewer action such as purchasing an advertised product, making a monetary contribution, responding to a survey, answering a question, or participating in contests with other viewers, for example. One problem with this existing system is that it is often difficult to motivate a viewer to request information or send in a contribution after the broadcast of the commercial or program. Viewers will often forget the advertisement or simply lose motivation to spend money or request information after the commercial or program is over. Another problem is that companies sponsoring these commercials or programs would often like to provide their viewers with further information, if the viewers could be identified or if the viewer requests the additional information. Thus, it would be desirable to provide a ready and efficient method to facilitate an exchange of information between television viewers and producers, promoters and advertisers during the broadcast of the commercial or program.

SUMMARY OF THE INVENTION

The present invention provides systems and methods for providing television schedule information on a visual interface, and for allowing the viewer to retrieve, initiate a subscription to, search, select and interact with information located in a remote database, computer network or on-line service, such as a network server on the Internet or World Wide Web. The television schedule information can be displayed on a variety of visual interfaces, such as televisions screens, computer monitors, PCTV screens and other interactive display devices. The television schedule information may be stored on the viewer's computer, television, PCTV, or a remote server (e.g., a website), or the television schedule information may be downloaded from a remote database or computer network to the viewer's computer, television or PCTV, and other interactive display devices. The present invention also provides systems and methods for allowing the viewer to navigate and interact with a program guide that is displayed, for example, on the viewer's television screen. The program guide will usually include a schedule and/or listing information area that depicts the programs that are available from a directory, library, or archival source or being presented on each channel at each time during the day, week or month. With an input device, such as a remote control device, pointing device, mouse, keyboard, microphone or the like, the viewer can browse through the schedule and/or listing information area and/or obtain more information about programs of particular interest.

In one embodiment, the present invention includes an interactive computer system which provides television schedule and/or listing information. All or portions of this television schedule information may be provided to a television system, a computer monitor, a PCTV and other interactive display devices. The interactive computer system can use the television schedule information to control various peripheral devices in the television system. Peripheral devices are, for example, televisions, video tape recorder(s), set-top boxes (including cable boxes), digital storage devices, and the like. In the preferred embodiment, a memory located within a personal computer stores a computer program and received data. These data include the television schedule information and eventually the digital files of the programs themselves. A processor uses the computer program to organize the television schedule and/or listing information into a desired format. The television schedule and/or listing information is then displayed on a television screen or on a computer monitor/display in the desired format.

BRIEF DESCRIPTION OF THE DRAWINGS

FIGS. 12A and 12B are schematic views of a representative program guide and a channel guide, respectively, for use with the television system of FIG. 1.

FIGS. 17A-17F illustrate a system and method for contextually linking a program to a database on a computer network.

DESCRIPTION OF THE SPECIFIC EMBODIMENTS

The present invention provides systems and methods for providing television schedule and/or listing information to a viewer, and for allowing the viewer to link, search, select, retrieve, initiate a subscription to and interact with information in a remote database, computer network or on-line server, e.g., a network server on the Internet or World Wide Web. The television schedule and/or listing information can be displayed on a variety of viewer interfaces, such as televisions screens, computer monitors, PCTV screens and other interactive display devices. The television schedule and/or listing information may be stored on the viewer's computer, television, PCTV, or a remote server (e.g., a website), or the television schedule and/or listing information may be downloaded from a remote database or computer network and/or internet broadcast to the viewer's computer, television or PCTV. Suitable television schedule and/or listing information systems or video guides that can be used with the present invention are described in commonly assigned U.S. Pat. Nos. 5,353,121, 5,479,266, the complete disclosures of which are hereby incorporated by reference. The systems and methods of the present invention may also be useful with video guides available under the name of SuperGuide™ from The SuperGuide Corporation of Shelby, N.C.

Figure 1:
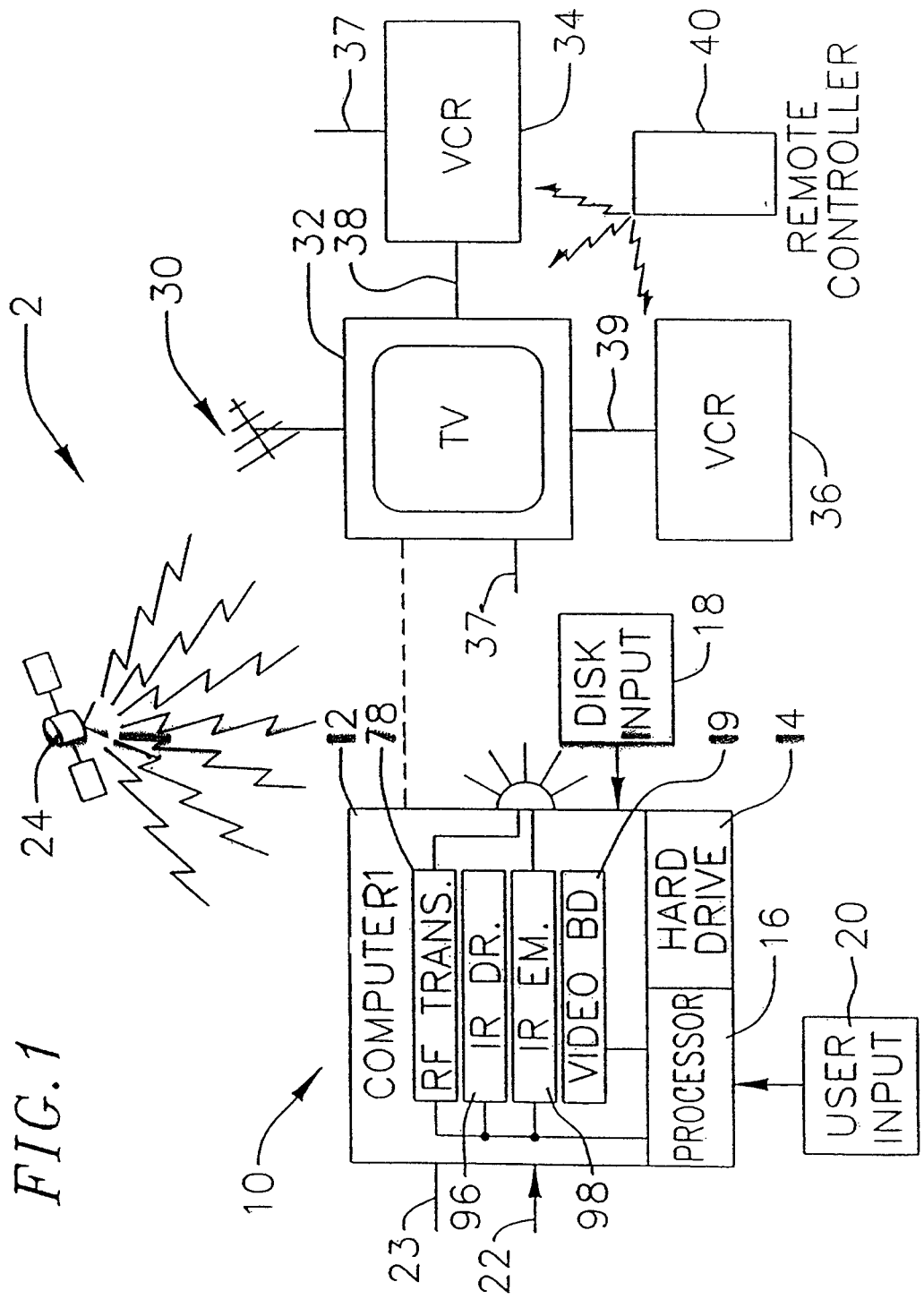
FIG. 1 is a schematic view of a representative computer system coupled to a television system.

In one embodiment, the invention incorporates an interactive computer system which assists the viewer in utilizing television schedule and/or listing information and linking with a database to search and retrieve, initiate a subscription to, information. Preferably, the information is contextually related to television programs within the television schedule and/or listing information. Referring to the drawings in detail, wherein like elements are indicated by like numerals, a representative television schedule and/or listing information system 2 for use with the contextual linking system and method of the present invention is illustrated in FIGS. 1-7. As shown in FIG. 1, schedule system includes a computer system 10 coupled to a television system 30. computer system 10 includes a standard computer 12 which is, for example, any available personal computer (e.g., IBM compatible, Macintosh, and the like). Computer 12 can also be located within a set-top box (e.g., a DSS box). Computer 12 contains a hard drive 14, a processor 16 and a disk input 18 for providing computer 12 with various, additional software. An input device 20 allows a viewer to interact with computer 12 and/or a television schedule guide (described below and illustrated in FIGS. 12-17). Line 23 is connected to an available serial, parallel or other data port 23 on computer 12. This line 23 is used to connect other devices/components to computer 12.

In another embodiment, computer system 10 may be combined with television system 30 to form a PCTV. In this embodiment, the computer will usually include a processor that may be used solely to run the program guide and associated software, or the processor may be configured to run other applications, such as word processing, graphics, or the like. The computer will usually be incorporated into the television set so that the television display can be used as both a television screen and a computer monitor. Alternatively, the television may be incorporated into the computer so that the computer monitor performs this dual function. Usually, the PCTV will include a number of input devices, such as a keyboard, a mouse and a remote control device, similar to the one described above. However, these input devices may be combined into a single device that inputs commands with keys, a trackball, pointing device, scrolling mechanism, voice activation or a combination thereof.

Television system 30 includes a television 32, which may be any commercially available television, and a user input device 20. Television system 30 may or may not include a video tape recorder (VCR). In this embodiment, VCRs 34 and 36 are coupled to television 32 through connections 38 and 39, respectively. These VCRs 34 and 36 can be, for example, any commercially available VCRs or any other type of recording and/or storage device (analog or digital).

Input device 20 allows the viewer to interact with television 32, VCR 34, and/or VCR 36. Input device 20 may be a remote control, keyboard 40, mouse, a voice activated interface or the like. A suitable input device for use with the present invention is described in U.S. Provisional Application Ser. No. 60/022,826, filed Jul. 26, 1996, and Ser. No. 60/015,648, filed Apr. 19, 1996, the complete disclosures of which are incorporated herein by reference. A line 37 is used to connect other devices to VCR 34. Other devices can also be connected in series between VCR 34 and television 32 via line 38. With this configuration, computer 12 (or computer system 10) and television 32 (or television system 30) can be located in different rooms within a private residence or a commercial building.

In one embodiment, a computer program provided on diskettes, a CD ROM or other medium contains the software needed for receiving, organizing and displaying data for the television schedule guide. These diskettes are inserted in disk input 18 and the software for these diskettes is stored within computer 12 on hard drive 14 or on another mass storage location. This action can be performed by, for example, the user or a serviceperson. The computer program can also be provided access, download, and/or automatically upgrade, for example, via downloading from a satellite 24, transmission through the internet or other on-line service, or transmission through another type of land line 22 (e.g., coax cable, telephone line, optical fiber, or wireless technology (e.g., Richochet™)).

In addition to the computer program, data for the basic schedule information and other related data (e.g., data relating to a particular show) are needed for the generation and maintenance of the television schedule and/or listing information guide. These data are received, in the preferred embodiment, via line 22; they can also be provided via a satellite broadcast from satellite 24 or wireless technology (e.g., Richochet™). Additionally, the television schedule and/or listing information and related data can be sent directly to television 32 via satellite 24 or wireless technology (e.g., Richochet™). In this arrangement, the television schedule information and related data does not have to be transmitted from computer system 10 to television system 30.

In one embodiment, line 22 is a telephone line which provides access to the internet or other on-line service via, for example, a regular modem or direct modem access to a schedule and/or listing information provider. The schedule and/or listing information data are then provided to the viewer from a remote database via the internet or other on-line service, or directly from the service provider. As stated above, line 22 can also be, for example, coax cable, optical fiber or any other land line which can provide data to computer 12 or wireless technology (e.g., Richochet™). The software program saved on hard drive 14 then utilizes the data received on line 22 to generate a television schedule and/or listing information guide. The user can access this generated television schedule and/or listing information guide when desired.

Figure 2:
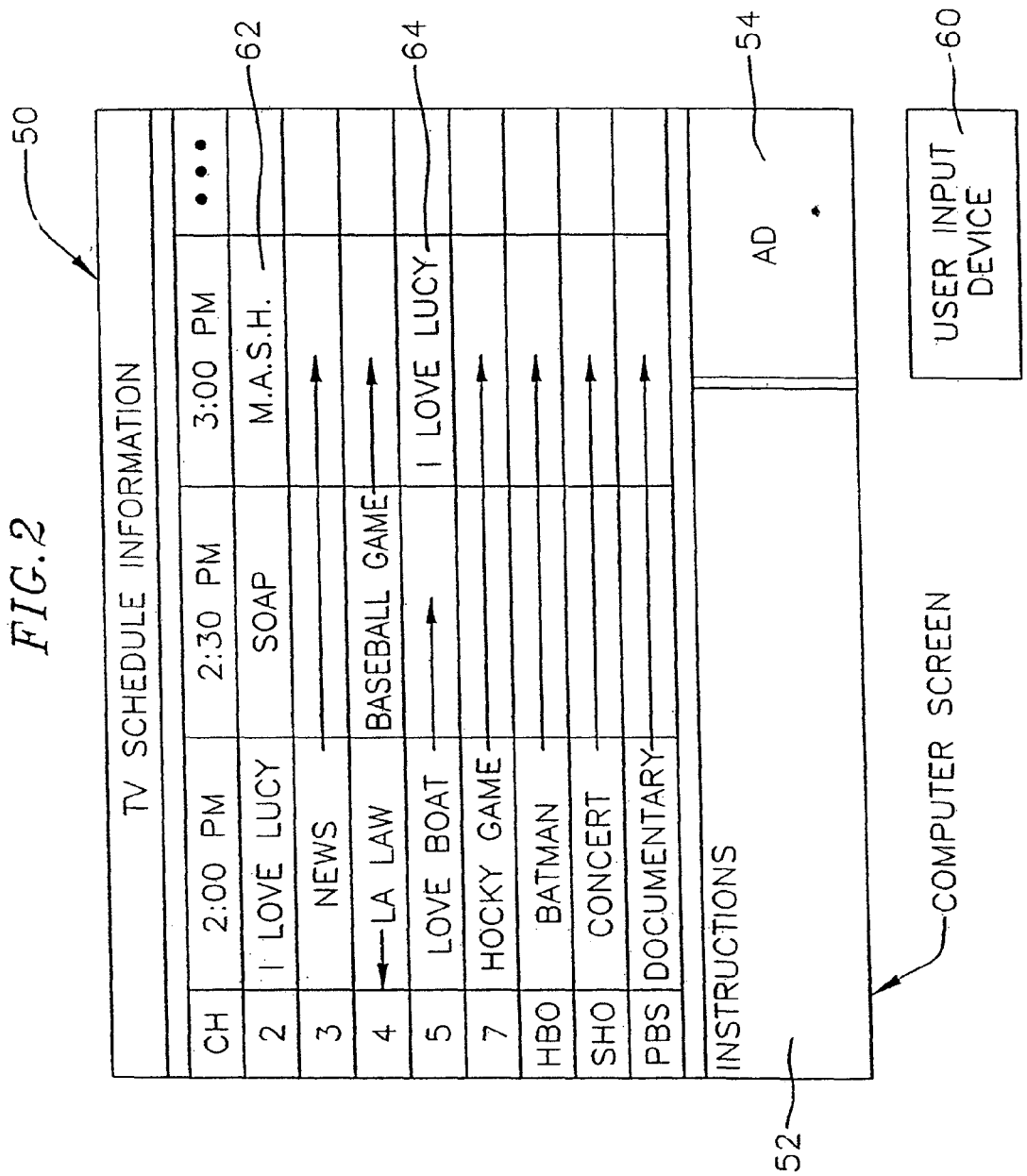
FIG. 2 shows an example of a television schedule guide as displayed on a computer screen along with a user input device.

FIG. 2 shows an example of a television schedule and/or listing information guide as displayed on a computer screen along with a user input device. In the preferred embodiment, the television schedule and/or listing information is provided in a grid-like display on computer screen 50. In this example, various channels are provided on the Y-axis of the grid guide, and various times are provided on the X-axis of the grid guide. This display can also contain special instructions for the user in screen area 52 and advertisements directed to the user in screen area 54. The television schedule guide in FIG. 2 has been customized by a user such that only channels 2, 3, 4, 5, 7, HBO, SHO and PBS are included in the displayed guide. In one embodiment, a television within computer system 10 or television system 30 can be used as computer screen 50.

The user, via input device 60, can scroll throughout the television schedule information provided in the grid guide. User input device 60 can be, for example, a keyboard with arrow keys, a computer pointing device (e.g., a mouse or trackball, touchpad, etc.) or a voice recognition input. By utilizing user input device 60, a user can sort, mix, and do a special customized line-up of channels within the television schedule guide displayed on computer screen 50. In addition, the user can automatically tune to a desired program or can select different programs for automatic recording and/or retrieval and digital storage. For more information on automatic tuning and automatic recording, see U.S. Pat. No. B1 4,706,121 and U.S. patent application Ser. No. 08/423,411; this patent and this patent application are, like the present patent application, assigned to Starsight Telecast, Inc. U.S. Pat. No. B1 4,706,121 and U.S. patent application Ser. No. 08/423,411 are hereby incorporated by reference in their entirety for all purposes.

In another embodiment of the present invention, the computer 12 is equipped with a television/video board that contains a tuner. When this television/video board is located in computer 12, a computer user can view selected television programs/shows on computer monitor 50. Therefore, when a user selects a television program for automatic tuning, the television/video board is tuned to the channel carrying the selected television program such that the selected television program is automatically displayed on computer monitor 50.

In the embodiment of the present invention shown in FIG. 1, two programs provided at the same time can be automatically recorded because two VCRs 34 and 36 are present. The user need only select two programs for recording and the present invention will automatically cause the programs to be recorded when they are aired in an unattended fashion. The user can also directly select which device or devices will be recording or tuning for each selected program. For example, the user may wish to have M.A.S.H. 62 recorded by VCR 34 and I LOVE LUCY 64 recorded by VCR 36. In this example, the computer software on hard drive 14, at the program start time, (1) tunes VCR 34 to the channel carrying I LOVE LUCY, (2) turns VCR 34 "on", and (3) activates the record function on VCR 34. If I LOVE LUCY starts at the same time as M.A.S.H., the software also, at approximately the same time, (1) tunes VCR 36 to the channel carrying M.A.S.H., (2) turns VCR 36 "on", and (3) activates the record function on VCR 36. At the program end time for M.A.S.H., the software turns "off" the record function, and then turns "off" VCR 34. The same sequence takes place for VCR 36 when the program end time for I LOVE LUCY occurs.

In the preferred embodiment, two electronic devices are used to provide the schedule/control system herein. These two electronic devices allow for the interaction between computer system 10 and television system 30. The first electronic device is a computer accessory and the second is a video tape recorder controller/connector (VCR connector) The second electronic device can also be a television connector, set-top box connector and the like.

Figure 3:
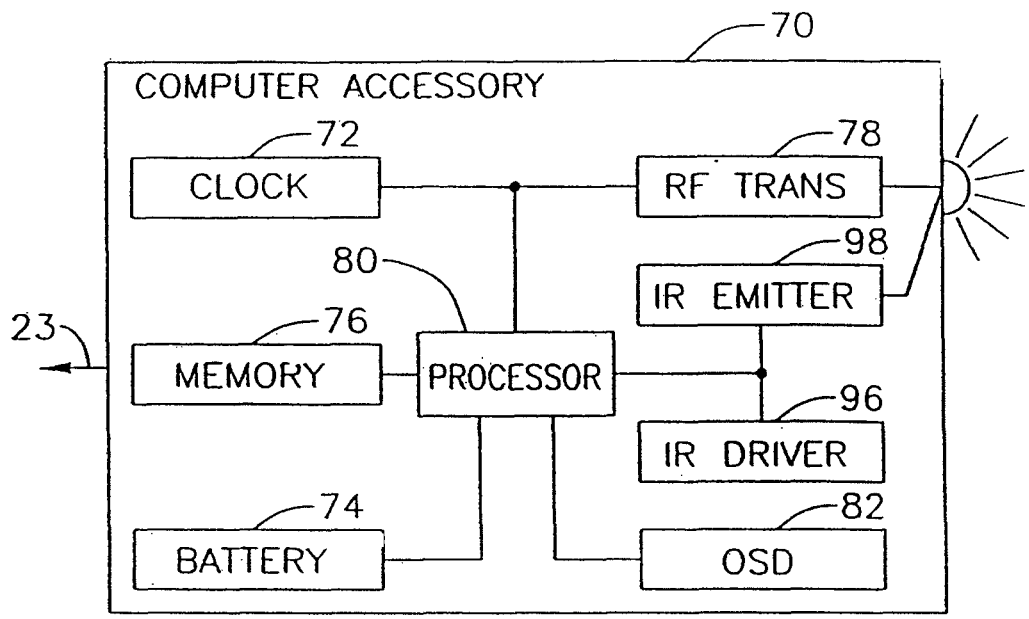
FIG. 3 illustrates a computer accessory for the computer system.

FIG. 3 illustrates a computer accessory for the computer system. Computer accessory 70 is any external hardware capable of controlling television 30, VCR 34 and/or VCR 36. In the preferred embodiment, computer accessory 70 is connected to computer 12 through available serial, parallel or other port 23. Clock 72, located within computer accessory 70 in the preferred embodiment, maintains current time. Battery 74 provides a continuous supply of power when the computer accessory's regular available power is not present. Memory 76 contains the key parameters needed for recording and/or tuning to a selected television program. These parameters include the date of the program, the start time for the program, the end time for the program, the television channel providing the program, and which peripheral device shall be addressed for recording or viewing the program.

Processor 80, also located within computer accessory 70, uses the software in the computer system to provide memory 76 with these key parameters. Memory 76 is a random access memory (RAM) and RF transmitter 78 is, for example, similar to a transmitter provided in a portable telephone or RF wireless headphones. RF transmitter 78 may be substituted with, for example, IR emitters, modulated light signals (i.e., signal sent through optical fiber), or even a hardwire connection. In the preferred embodiment, RF transmitter 78 is used in conjunction with a remotely located VCR connector 90 to communicate parameters needed for automatic tuning and/or automatic recording to television system 30. Processor 80 uses clock 72 and memory 76 to provide the information needed for transmission by RF transmitter 78.

Figure 4:
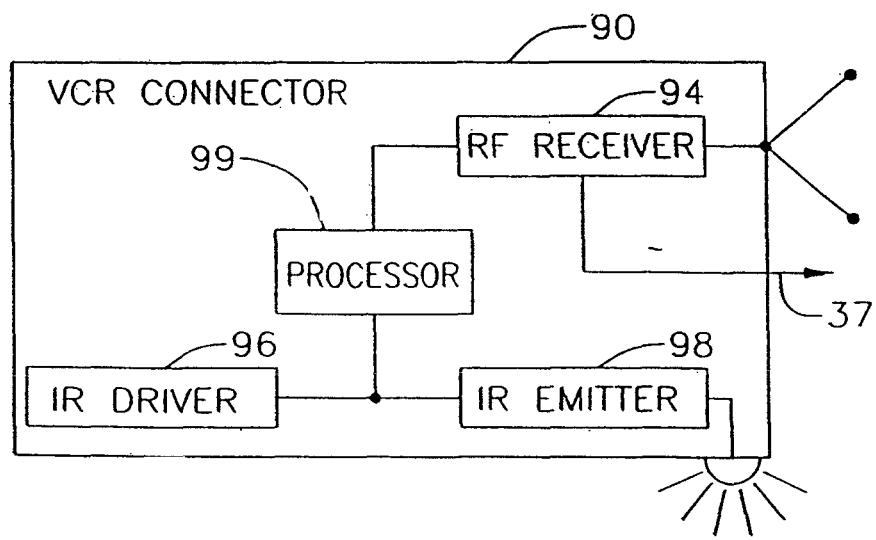
FIG. 4 illustrates a recording device connector for the television system.

FIG. 4 illustrates a recording device connector for the television system. In the preferred embodiment, recording device (e.g., VCR) connector 90 is coupled to VCR 34 in television system 30, via line 37. This connector 90 can also be a television connector which is connected to television 32. VCR connector 90 contains RF receiver 94 which receives the information transmitted from RF transmitter 78. Infrared (IR) driver 96 then works in conjunction with IR driver 96 and IR emitter 98 to provide any necessary signals to other peripheral devices within television system 30. Processor 99 assists with this process.

For example, if a user decides to tune the television to a certain program which is presently available or to schedule the television to be tuned to a certain program at a future time, the user moves the cursor with user input device 60 to the desired show within computer screen 50 and enters it ("enter" key with a keyboard or "clicking" with a mouse). The information is provided to computer accessory 70 via line 23 and then automatically transmitted via. RF transmitter 78 to RF receiver 94. IR driver 96 and IR emitter 98 then take the information from RF receiver 94 and immediately tune the television 32 to the channel providing the selected television program. More than one IR driver 96 may be used for the present invention. For example, one IR driver may be used for television 32, and another IR driver may be used for VCR 34. In addition, computer accessory 70 and VCR connector 90 (or the alternative devices which provide their functions as described below) can be located in different rooms within a private residence or a commercial building.

If the user has selected a program from the computer for recording on VCR 34, at the selected program's start time, the information for activating and recording on the VCR is automatically sent from RF receiver 94, through VCR connector 90, to VCR 34 via line 37. Thus, in the preferred embodiment, at the start time of the selected program, (1) the VCR is turned "on", (2) the tuner (or an external device) is tuned to the channel carrying the selected program, and (3) the record function of the VCR is activated. Later, when the program end time occurs, the record function of the VCR is turned "off," and the VCR is turned "off." In this arrangement, IR driver 96 and IR emitter 98 are not used.

In the preferred embodiment, when IR driver 96 and IR emitter 98 are used, they act in the same way that a remote control would act to control the other peripheral devices (e.g., television 32, VCR 36, and the like) within television system 30. For example, if two programs occurring at the same time are selected for automatic recording, IR driver 96 and IR emitter 98 are used to (1) tune the tuner on a second VCR to the channel carrying the selected program, etc. For additional information on how an IR emitter can be used to act as a remote control, see U.S. Pat. No. 5,151,789 to Young, which is hereby incorporated by reference in its entirety for all purposes.

In another embodiment of the present invention, VCR connector 90 is connected in series between VCR 34 and television 32 via line 38. In this arrangement, IR driver 96 and IR emitter 98 are not needed because information received by RF receiver 94 can be sent to either VCR 34 or television 32 via line 38. For example, line 38 is used to transmit the data for automatic tuning. When a user selects a television program for immediate viewing, a tuning command for changing the television tuner to the channel carrying the desired program is sent from RF transmitter 78 to RF receiver 94. Processor 80 then sends this tuning command from RF receiver 94 to television 32 via line 38.

In yet another embodiment of the present invention, IR driver 96 and IR emitter 98 are located in computer accessory 70 (see FIG. 3). When this configuration is present, VCR connector 90 is not needed. For example, when a desired television program is selected for automatic tuning, IR driver 96 and IR emitter 98 work in conjunction to tune television 32 to the channel carrying the desired program. Similarly, when a desired television program is selected for automatic recording, IR driver 96 and IR emitter 98, at the desired program start time, (1) tune the VCR to the channel carrying the desired program, etc. This arrangement can also be used when multiple desired television programs, airing at the same time, are selected for automatic recording. This is done in the same manner as described above. Also, if desired, the data providing the television schedule information to computer 12 can be organized into a desired format and then transmitted via computer accessory 70 to television 32 for immediate display on television 32. For automatic display on television 32 in this arrangement, computer accessory 70 must contain on-screen display generator (OSD) 82.

In yet another embodiment of the present invention, computer accessory 70 is located inside computer 12 (see RF transmitter 78 location in computer 12, FIG. 1) and/or VCR connector 90 is located inside, for example, VCR 34 or television 32. The location of computer accessory 70 and VCR connector 90 is not critical because the IR emitter allows for remote control of all of the peripheral devices.

In yet another embodiment of the present invention, the components of both computer accessory 70 and VCR connector 90 are located inside computer 12. Therefore, RF transmitter 78 and RF receiver 94 are not required. Computer 12 most likely has an internal battery and clock provided, so battery 74 and clock 74 may not be needed. Memory 76 can be provided by hard drive 14. Processor 80 may not be needed because processor 16 can perform its functions. In this embodiment, IR driver 96 and IR emitter 98 provide the tuning and recording parameters to television 32 and VCRs 34 and 36 (see FIG. 1 for placement of IR driver 96 and IR emitter 98 within computer 12). Similarly, if computer 12 contains television/video board 19 in this arrangement, a selected television program can be viewed on computer screen 50. Additionally, a selected television program can be stored within computer 12 in a memory or mass storage device (e.g., hard drive 14, disk or tape). Thus, no need would exist for the transmission of parameters needed for automatic tuning and automatic, unattended recording, and the associated IR devices 96 and 98 would not be present. Finally computer 12, television system 30, VCR 34 and all additional electronic devices could be on a home network. In this arrangement, no transmitters or internal receivers would be necessary.

Figure 5A:
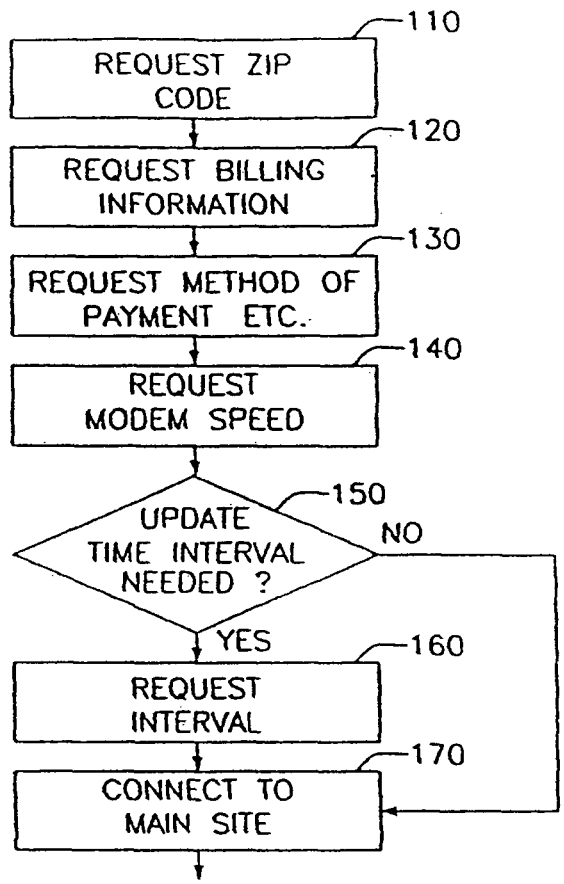
FIGS. 5A and 5B illustrate a process flow chart for the installation procedure.
Figure 5B:
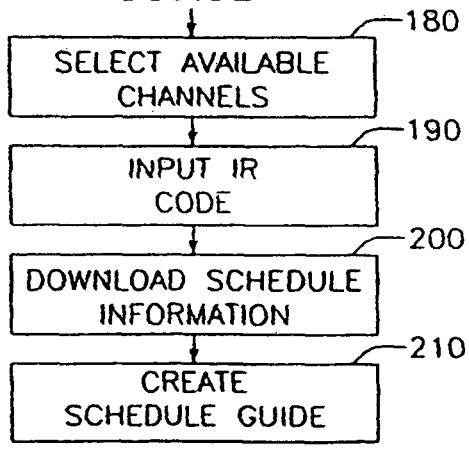

FIG. 5 illustrates a process flow chart for the installation procedure. This process flowchart reveals the sequence used for installing the computer program needed for receiving, organizing, and displaying the television schedule information grid guide. This installation process flow allows for an account setup and for the downloading of schedule information. The data needed for the television schedule guide are downloaded to hard drive 14 in the preferred embodiment. As stated above, diskettes providing the computer program are placed in disk input 18 and installed on hard drive 14. The user is then asked to input various information. The system first requests the user's zip code at step 110. Billing information is requested at step 120, and method of payment along with associated information for payment is requested at step 130. In an alternative embodiment, billing information (e.g., credit care information or the like) may be input each time a user connects to an on-line service. Additionally, an automatic confirm may take place at step 120. For example, a user may already have an identification number from previous system use. Confirmation of this identification number would allow the system to access stored user profile information which contains the user's billing data.

In the preferred embodiment, modem speed for the communication setup is requested at step 140 (this step is optional). The computer program, in conjunction with processor 16, checks to see if the update time interval is needed at step 150. The update time interval determines how often the television schedule guide information is updated for the user. For example, updates could take place each time computer 12 is booted-up, once a day, or 4 times a week. If the update time interval is needed, a request is sent to the user at step 160. If the time interval is not needed, a connection to the main site is made at step 170. The main site provides the data needed for the television schedule guide and receives information, such as a credit card number for billing purposes, via line 22. The user can then select which available channels will be displayed on computer screen 50 at step 180. Thus, the user can customize the displayed information at step 180. The user is then asked to input or select IR codes at step 190. These IR codes are used for communicating with peripheral devices within television system 30. In the preferred embodiment, these IR codes are sent to memory 76 within computer accessory 70. The data needed for the television schedule are then downloaded via line 22 at step 200. Processor 16 and the computer program installed on hard drive 14 work in conjunction to create the schedule guide for display on computer screen 50 at step 210.

Figure 6:
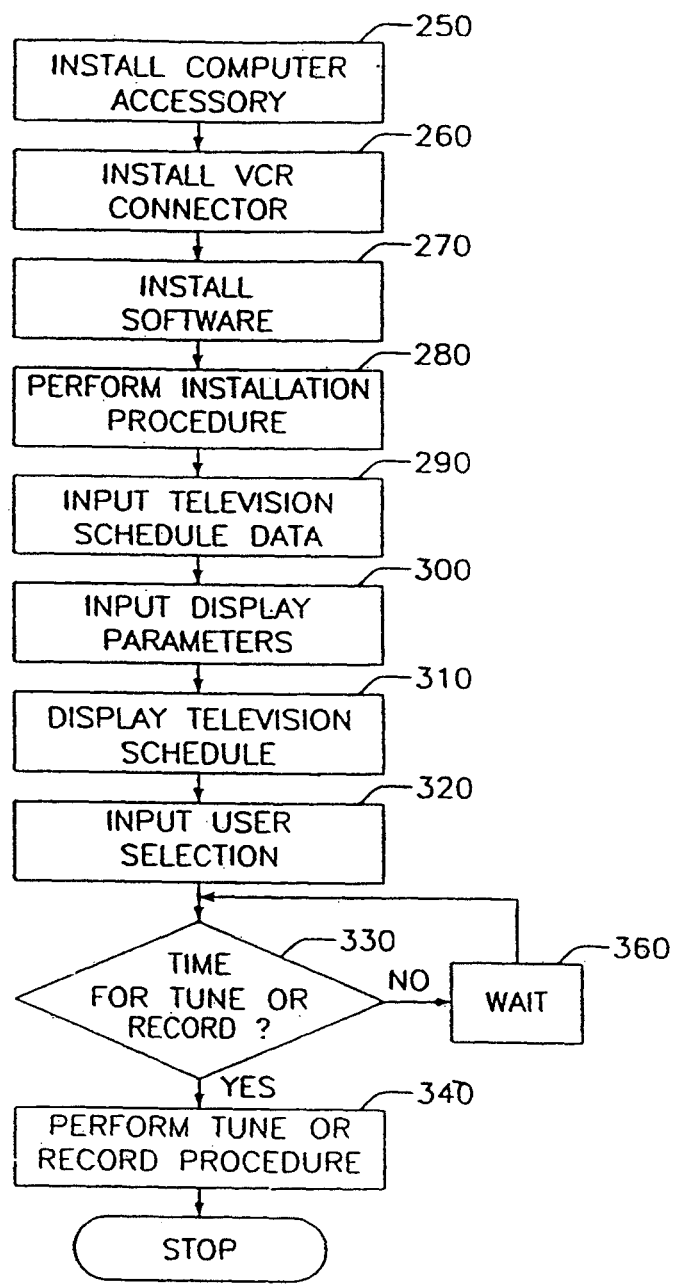
FIG. 6 illustrates a process flow chart for the operation of the schedule/control system herein.

FIG. 6 illustrates a process flow chart for the operation of the schedule/control system herein. At step 250, the user installs computer accessory 70 by coupling it to computer 12 via available serial or parallel port 23. At step 260, the user installs VCR connector 90 by connecting it to VCR 34 via line 37. At step 270, disk input 18 is used to provide hard drive 14 with the software needed for receiving, organizing and displaying data which provides the system's television schedule guide. This software also supplies the automatic tuning and automatic, unattended recording of the present invention. Thus, this software is taken from diskettes and stored/installed on hard drive 14. At step 280, the user or service person performs the installation/set-up procedure set forth in FIG. 5. At step 290, the data needed for updating the schedule information are received via telephone line 22.

At step 300, the user can input any additional desired display parameters for the display of the television schedule guide. For example, the user can have certain channels eliminated from the displayed television schedule guide, or the user can select a particular order for each of the television channels within the guide. At step 310, the television schedule guide is displayed, upon user request, on computer screen 50 as shown in FIG. 2. At step 320, the user can enter a selection from the television schedule guide via user input device 60. The user can select a program for either automatic tuning or for automatic, unattended recording. At step 330, the software determines if the time for the automatic tune or record is equal to the present time. If the program start time is not equal to the present time, then the software waits at step 360. If the time equals the present time, then the software performs automatic tuning or automatic recording at step 340. Automatic tuning and automatic recording is set forth in U.S. patent application Ser. No. 08/423,411, as stated above. The process flow chart of FIG. 6 is then complete.

In another embodiment of the present invention, a computer program located, for example, on hard drive 14 can monitor and track user selections. This computer program can then be used to provide suggested television programs to the user. Additionally, if desired, the computer program can automatically schedule suggested television programs for automatic tuning and/or automatic, unattended recording.

Figure 7:
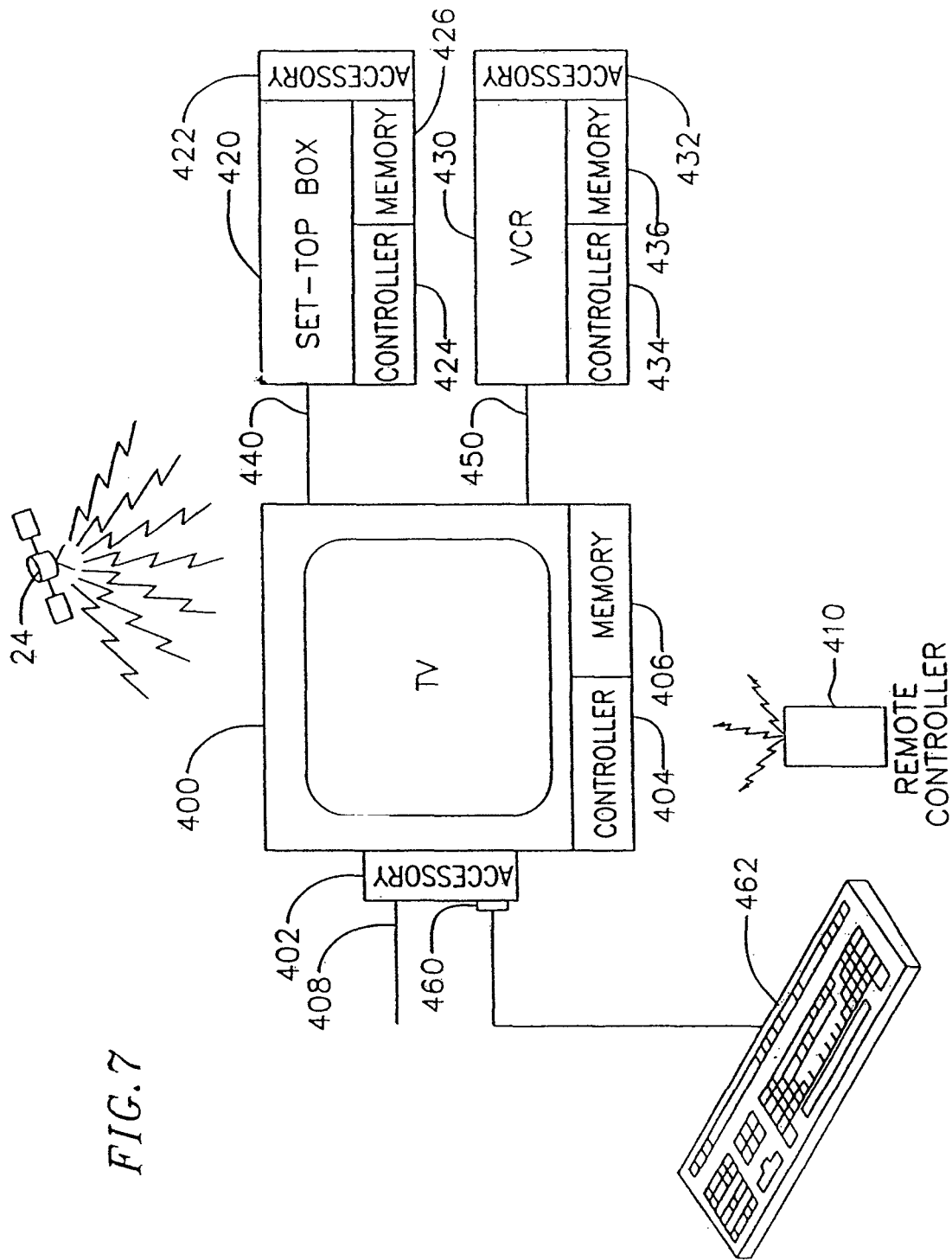
FIG. 7 illustrates several arrangements for providing television schedule information from a database to a television for display.

FIG. 7 illustrates several arrangements according to the present invention for providing television schedule information from an external database to a television for display. In one embodiment, on-line information providers (Prodigy, America On Line, Compuserve, MSN, AT&T, etc.) provide access to a database which contains the television schedule information. These on-line information providers can transmit data to television 400. In this embodiment, a modem within accessory 402 is utilized to provide the data. Accessory 402 is attached to television 400 and directly connected to telephone line 408 via the modem. The modem for access to the on-line service can also be located within television 400. Software, located either within accessory 402 or television 400, is used to search for and provide the data, along with providing several other features described below.

The available data, displayed on television 400, can emulate what a computer on-line user normally sees when accessing the internet through a personal computer. This television schedule data can also be further enhanced to "tie into" the televisions show that the user is viewing. Alternatively, accessory 402 may be replaced by accessory 422 which is attached to set-top box 420 (e.g., a cable box). The data provided via the on-line information provider is then transmitted to television 400 over line 440. Similarly, accessory 432, attached to VCR 430, can be used to obtain the television schedule data. The data would then be transmitted from VCR 430 to television 400 over line 450.

In another embodiment, the database with the television schedule information is located in memory 406 within television 400. Controller 404 is used to obtain the data from memory 406 so that it can be displayed on television 400. Alternatively, the database with the television schedule information could be located in memory 426 (within set-top box 420) or in memory 436 (within VCR 430). Controller 424 or controller 434 would be used to obtain the data which would then be sent to television 400 for display via line 410 or line 450. Therefore, the technology that enables the television schedule information to be provided from a database to a television for display is not specific to any given data system. In summary, this technology can be resident in the user's set-top box 420, television 400, VCR 430, personal computer or the like.

The television schedule information provided from a database can be used to provide information which is independent of the viewer's program choice. For example, from a television schedule guide, the user can utilize remote control 410 to press a Services button. This Services button can be located on remote control 410 or within the television schedule guide display. When the Services button is pressed, the user is given choices such as News, Weather, Sports, Scores, Financial Data, Local Traffic, etc. Using remote control 410, the user can then select the area or title of interest, and the associated information from the database is provided. If accessory 402 is used, a modem accesses the on-line service which provides the information from the database. Once this connection is made, the user has two-way communication with the on-line service provider. The user can then go deeper into the given selections or, if requested and keyboard 462 is available, can access the Internet and enter chat rooms or other interactive services. In the preferred embodiment, keyboard 462 is either an IR keyboard or connected to port 460 on accessory 402.

In yet another embodiment, a television program title and/or a program's content is contextually linked to an on-line service or to an available database. In this arrangement, a user, in conjunction with the data made available through an electronic program guide (or navigational system), can link, search, select, and/or initiate a subscription to more information relating to specific areas of interest or concerns associated with a program or a program's title. In the preferred embodiment, a user of an electronic program guide (e.g., as described above) can conduct a search for information about a particular program/television show or for information relating to the show, the actors, the actresses, the show's theme, other broadcast times or sources, and other related information through selection via a user interface. This linking of program title and/or program content to additional related information could be operable whenever a program title is accessible in a electronic program guide. Additionally, this linking could be available whenever a user requests it via the currently tuned program.

For example, a user previewing the program such as a movie (e.g., "Casablanca") can receive information regarding (1) the actors and actresses in that movie, (2) other movies released during the same time period, (3) associated available products, (4) related travel packages, and (5) advertisements and promotions available through primary, secondary or third party vendors, other broadcast times or sources. Utilizing a user interface such as remote control 410 or keyboard 462, the user can indicate to the electronic program guide what information they would like to view on television 400. The electronic program guide then lists a selection of choices for the user. In the preferred embodiment, the choices are associated with the context of the selected program and can be changed via the electronic program guide supplier. In the "Casablanca" example, the choices might be (1) Other Humphrey Bogart Movies, (2) Other Lauren Bacall Movies, (3) Other Movies Released in the Same Era, or (4) Associated Products, other broadcast times or sources. The user selects from the presented choices, and the electronic program guide contacts and communicates with the database of available information for more detailed information relating to the user's choice. Once contact and communication is established between the user and the database of available television information, the electronic program guide acts as an agent to assure that the information flow and appropriate data is exchanged. At this point, the user can delve deeper into the available information by selecting from a series of further choices or related topics. For example, if the user chooses (1) Other Humphrey Bogart Movies option, the electronic program guide contacts and communicates with the selected database of available information. The database of available information is then used to collect the requested data of other Humphrey Bogart movies. The selected choice is transmitted and used by the electronic program guide as its contextual reference for the search. A list with the search results is then displayed on television 400.

Once the user sees the list of broadcast times or sources for "Casablanca," or other Humphrey Bogart movies, the user can select any of the available titles for recording or watching, or digital storage when digital program directories, libraries, or archival sources are available. In the preferred embodiment, each time the available database is contacted and searched, previously selected movies can be identified. In addition, a user can select certain types of programs to be recorded, watched, or retrieved for digital storage before any particular program is available to the electronic program guide. Moreover, each time a connection is made to an on-line service, the software can search the database and set the selected types of programs to be recorded and/or retrieved for digital storage. These features enable a consumer to never miss a favorite program.

The system and method of the present invention may be configured to automatically or manually customize the television schedule guide to an individual viewer or a group of viewers, e.g., a family. In this embodiment, the remote control device may be used to select certain programs, and a memory stores the television programs that have been selected by the viewer. The programs can be selected for a variety of reasons, such as a designation of the program as a favorite, placing a reminder to watch the program or, when the television schedule system includes a recording device, placing an automatic reminder to the program guide to record the program or, when the television schedule system includes a means of digital storage, automatically downloading or providing an easy confirmation process for downloading the program. The user may also customize specific preferences based on a program title. Through a series of repetitive operations, the electronic program guide can select programs, titles or services that the user would likely be interested in. This can be accomplished through a user interface wherein the user answers preference or choice questions, or through heuristic learning accomplished through the electronic program guide. The electronic program guide would include software for performing this customization.

In an exemplary embodiment, the system includes a database containing each program within the television schedule and/or listing information. The database may be included within a computer integrally combined with the television (e.g., PCTV), a computer that is coupled to the television through suitable lines, or the database may be accessed from a remote computer, e.g., via the internet or other communication medium. Within the database, each program is associated with a variety of criteria or features, such as particular actors, actresses, directors, the type of movie (e.g., action, comedy) and the like. When the viewer selects a program as a favorite, for example, he or she will have the option of designating the criteria or reason(s) that the program is a favorite (i.e., actor, director, etc.). The computer will include a processor and suitable software for automatically searching the database for other programs having the same criteria. The processor will automatically place the programs that include the designated criteria into the selection window and provide visual indication of each program in the matrix of cells in the program guide. In this way, the program guide will automatically customize itself to the individual viewer to facilitate use of the television schedule. A more detailed description of this method can be found in commonly assigned U.S. Provisional Application Ser. No. 60/015,648, filed Apr. 19, 1996, the complete disclosure of which has previously been incorporated by reference.

Figure 8:
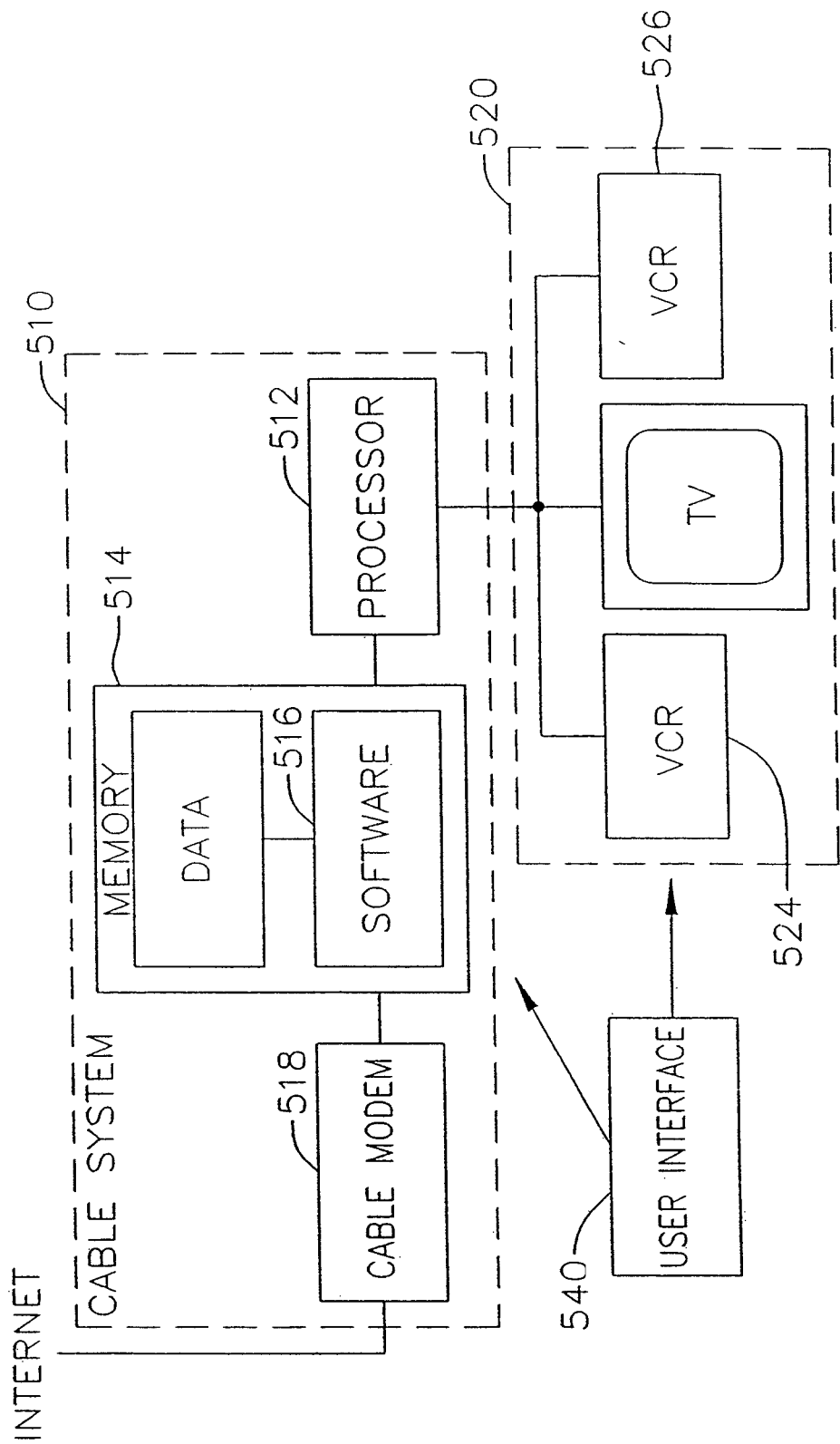
FIG. 8 illustrates an interactive television schedule system according to the invention incorporating a cable system coupled to a television system.
Figure 9:
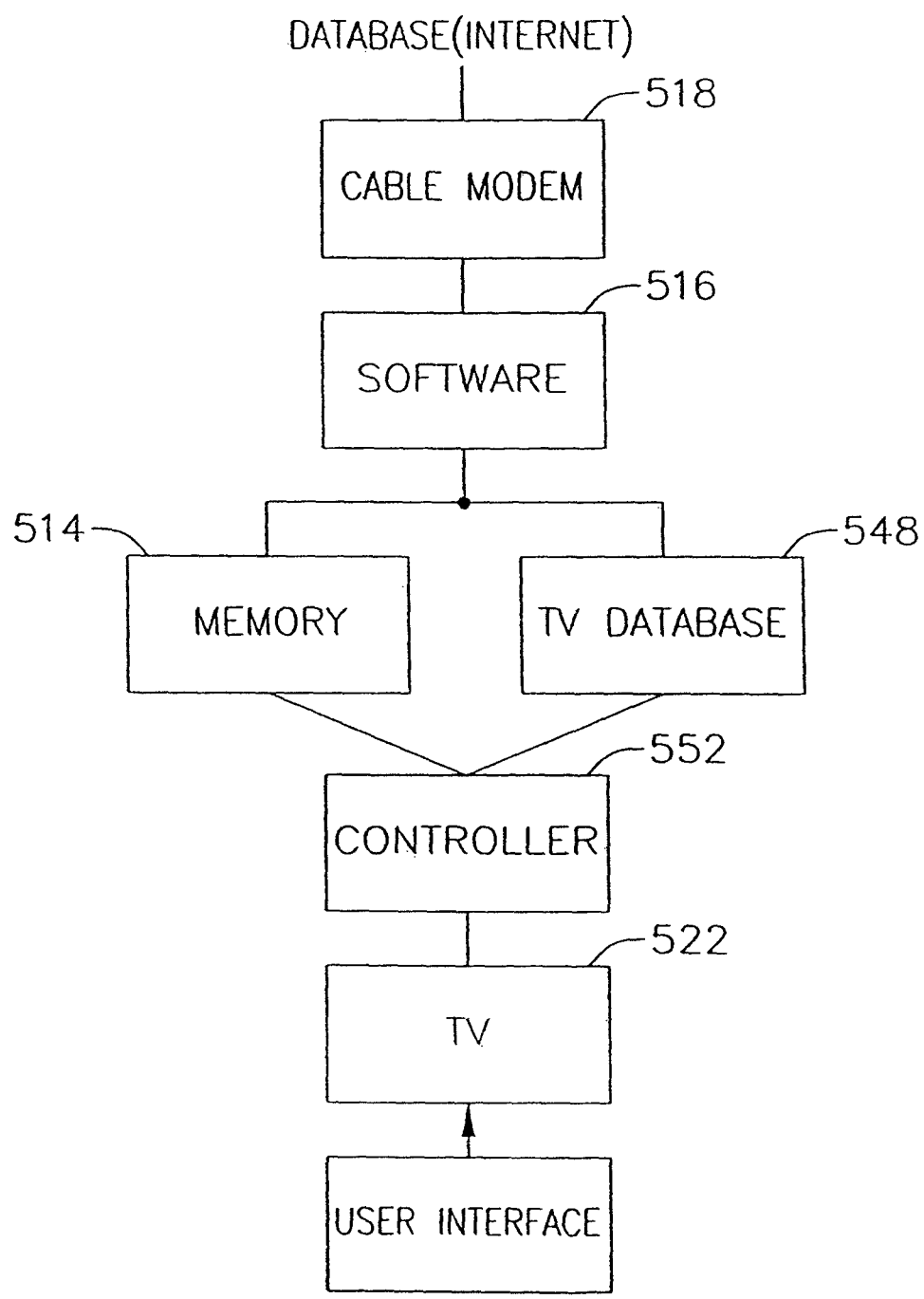
FIG. 9 illustrates a preferred arrangement for providing television schedule information from the cable system of FIG. 8 to a television for display to the viewer.

FIGS. 8 and 9 illustrate an interactive television schedule system 500 according to the present invention which can access television schedule information from the Internet, and provide user access to the internet. Access to the S internet may be provided in this embodiment without tying up any phone lines, and without the need for a personal computer (e.g., an "NC" or Network Computer). As shown in FIG. 8, interactive television schedule system 200 includes a cable system 510 coupled to a television system 520. Cable system 510 generally includes a processor 512, and a memory 514. Television system 520 includes a television 522 and a user interface device 540. Similar to the above embodiment, television system 520 may include VCRs 524 and 526 coupled to television 522. In a specific embodiment, memory 514 of cable system 510 stores software 516 for receiving, organizing, and displaying any received data into a television schedule guide. In addition to software 516, data for the basic schedule information and other related data (e.g., data relating to a particular show) are also stored in memory 514 as they are needed for the generation and maintenance of the television schedule guide. This data is received, in the preferred embodiment, via a cable modem 518, which may access the data from the internet. The software 516 then utilizes the data received from cable modem 518 to generate a television schedule guide. The user can access this generated television schedule guide when desired.

In the embodiment of the present invention shown in FIG. 8, two programs provided at the same time can be automatically recorded because two VCRs 524 and 526 are present. The user need only select two programs for recording and the present invention will automatically cause the programs to be recorded when they are aired in an unattended fashion. The user can also directly select which device or devices will be recording or tuning for each selected program. For additional information, see commonly assigned U.S. Pat. No. 5,151,789 to Young, the complete disclosure of which has previously been incorporated by reference.

FIG. 9 illustrates an arrangement for providing television schedule information from cable system 510 to a television for display. In one embodiment, cable modem 518 provides access to a database, which may be on-line; the database contains the television schedule information, and the information is transmitted to the television. Software 516 stored in memory 514 is used to search for and provide the information, along with providing several other features described below. The available data, displayed on the television, may be stored in memory 514 within cable system 510, or within a database 548 within television 522. A controller 552 is used to obtain the data from memory 514 or from database 548 to display it on television 522. From the television schedule guide, the user can further utilize user interface 540 to press a "Services" button. This Services button can be located on the user interface or within the television schedule guide display. When the Services button is pressed, the user is given choices such as News, Weather, Sports, Scores, Financial Data, Local Traffic, Network, etc. Using the user interface, the user can then select the area or title of interest, and the associated information from the database is provided.

The user can further access the internet by choosing Network from the guide using the user interface. Cable modem 518 accesses the Internet, and once connection is made, the user has two-way communication with on-line service providers. The user can then access the different on-line services. For example, a user viewing a sporting event may press the Services button, and a different menu will appear with the following choices: (1) Sports Scores, (2) Current Game Statistics, (3) Current Player Statistics, and (4) Associated Products. If the user selects (4) Associated Products, the software, will notify the cable modem and instruct the cable modem to establish connection with an on-line service provider. The on-line service provider then lists a series of selections associated with the game (e.g., 49er's hats, Giant's Baseball Bats from Louisville Slugger, Nike Spiked Football shoes for Pop Warner, etc.), and the user can interact with the service provider accordingly.

Figure 10:
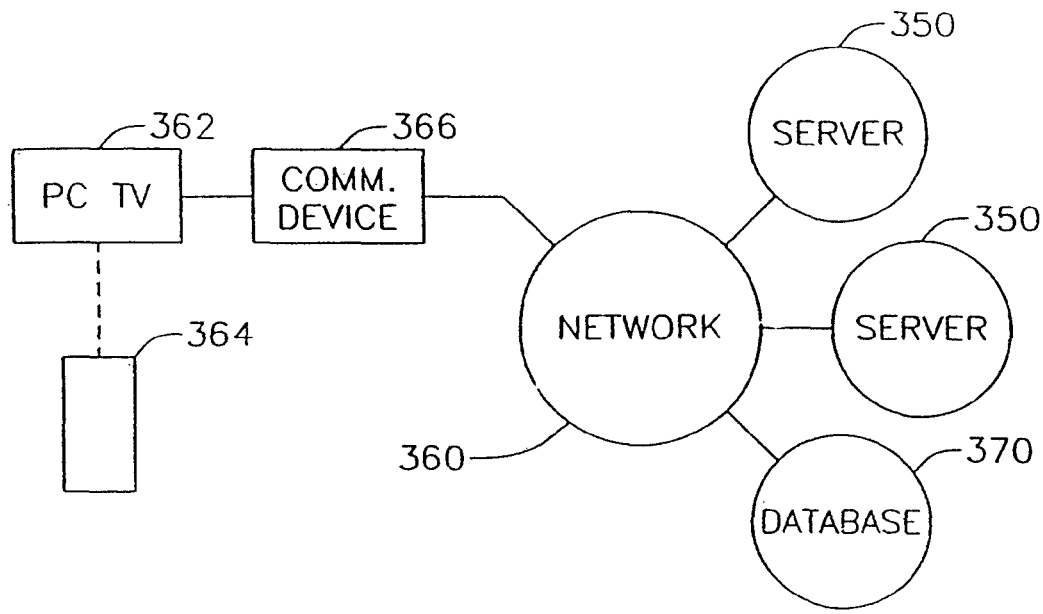
FIG. 10 illustrates a system and method for accessing television schedule information at a network file server on the internet.

FIG. 10 illustrates a system and method for accessing television schedule information from one or more servers 350 on a computer network 360, such as the Internet or the World Wide Web. The television information guide may be accessed and viewed through a computer system, a television system, a PCTV, or a simple display coupled to a communication link, such as a telephone line or the like. In the representative embodiment, a PCTV 362 is illustrated with a user input device 364, such as a remote control, keyboard, mouse or the like, and a communication device 366 for accessing computer network 360. As discussed above, communication device 366 may include a wide variety of data lines, such as telephone lines, cable modems, etc.

In one embodiment, the computer network 360 includes a plurality of servers 350 and a database 370. The database 370 includes television schedule information, which may be retrieved and viewed on PCTV 362. Servers 350 represent file servers having files, databases or the like. In a representative embodiment, the computer network is the World Wide Web and each server 350 is set up as a network file server addressable by a unique address. For example, the servers 350 may be configured to follow a common network protocol such as the Transmission Control Protocol (TCP), and the Internet Protocol (IP) (commonly referred to collectively as TCP/IP), and may be assigned a unique IP address or internet domain name. For example, the servers may be assigned the domain name "invoice.com". The servers 350 may also have some form of server software installed to permit the system to function as an internet graphics server. For example, the servers 350 may be configured with HyperText Transport Protocol (HTTP) server software to permit the system to function as an internet "world wide web" (WWW) server. In this embodiment, PCTV 362 may access servers 350 via the WWW using WWW compatible software by indicating the system's uniform resource locator address.

In another embodiment, the television schedule guide (not shown) is stored as one or more files (e.g., a websites or internet broadcast transmitters) on one of the servers 350, which can be accessed by any viewer having access to the World Wide Web. The television schedule guide or website may be configured for viewing and interacting with television information directly on-line, or it may be configured for downloading the information into a computer hard drive or other suitable processor. The guide will provide listings information for all channels in the viewer's local cable line-up. Preferably, the guide will be capable of creating personalized TV listings with search and sort features (discussed below) that allow the viewer to call up favorite programming choices based on categories, such as channel, day, actor, movie genre or other desired categories. The guide may also include other information about programs, such as ratings, stars, type of movie (e.g., suspense, comedy, drama, western, musical, children, biography, horror, etc.). This information may be provided on the actual website and/or internet broadcast transmitter, or the website and/or internet broadcast transmitter may provide means for linking the viewer with other websites and/or internet broadcast transmitter to provide more information-on certain topics and categories.

Since the television guide website and/or internet broadcast transmitter may be accessed from virtually any location in the world, it will preferably include a mechanism for selecting a region from which the television guide is applicable. For example, the television guide may include television schedule and/or listing information from a variety of countries throughout the world, or the information guide may be limited to the United States. To obtain television schedule information for a particular region, the user can select an appropriate state, city, or other region, such as a region covered by a particular cable company. Alternatively, the television schedule guide may provide information for certain networks and stations (instead of particular channels or stations), such as CBS, FOX, HBO and the like, that are global to all regions of the country. With this configuration, the television guide may include a time zone selection so that the guide can automatically be configured for the particular time zone in which the user will watch television.

In one embodiment of the present invention, the system will include a search engine that allows the viewer to search for particular types of programs that will be broadcast within a certain period of time. The search engine may include categories such as title, description, category, dates, day parts, channels, actor/actresses, directors, etc. In addition, the viewer may obtain more information on the programs within each category. For example, the guide could provide information on movies in many categories, including theatrical, made-for-TV movies, Spanish, French, etc. The guide can tell you what Clint Eastwood movies are on this week, how many StarTrek episodes this weekend, or whether your favorite basketball team is on TV this Saturday. The on-line viewer may customize their own listings by title, year, actors, director, run themes, critical star rating, MPAA, warning lines, video laser disc, full descriptions, genre, and holidays with themes. In another example, the guide could provide information on shows and series, including network shows, first run, British, PBS, cult favorites, syndicated shows, talk shows, local productions and obscure programs. The user may sort by, for example, title, episode run times, genre, original air date, etc.

In another aspect of the invention, the web site television guide will include a highlight section that highlights particular programs that will be broadcast during the day, week or month. For example, the guide may have a web page that picks a "hot pick" for each day of the week, and provides a picture or video together with descriptive information, such as an editorial comment, on the video hot pick. In addition, the user may be able to move to other areas where more information can be provided on particular moves, such as articles, interviews with actors/actresses, editor's choice reviews, commentaries, etc.

In another aspect of the invention, the system will include a variety of files on the same or different network servers that allow the user to interact with other users, program sponsors, advertisers, etc. For example, the system may have a web site that allows viewers to chat about certain programs (each program itself may have its own web site). In addition, the system may include a "virtual agent" that searches existing websites and/or internet broadcast transmitter on the Internet and points to websites and/or internet broadcast transmitters that may interest the viewer. The virtual agent will learn from previous user choices to customize the television guide for each particular viewer.

Figure 11:
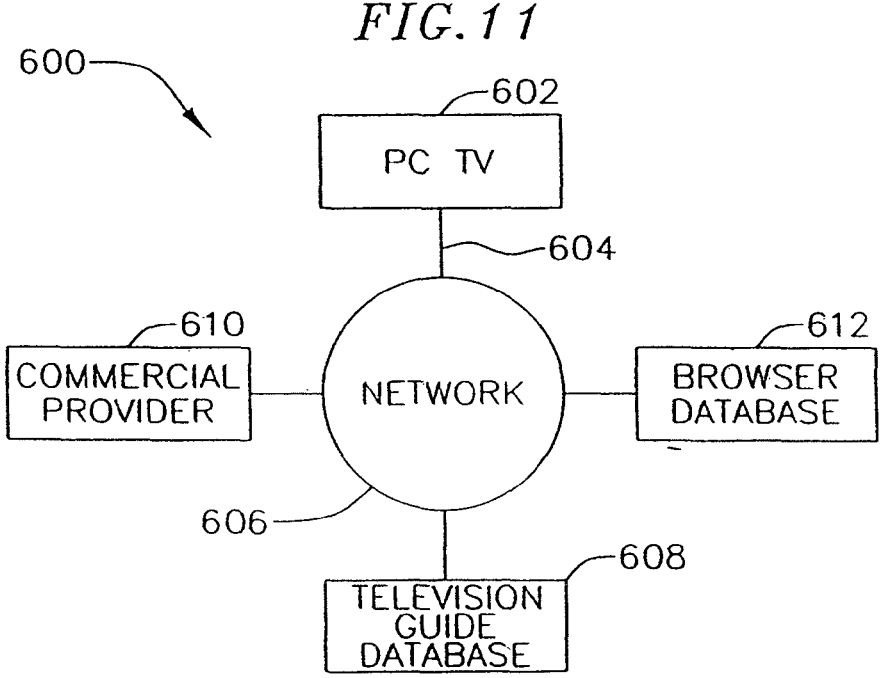
FIG. 11 schematically illustrates a system and method for viewer interaction with commercial advertisers and program sponsors within the television schedule information system of the present invention.

FIG. 11 schematically illustrates a system and method according to the present invention for linking television viewers with broadcasters and advertisers during the broadcast of a commercial or program. As shown, system 600 includes a viewer interface 602, such as a television, computer, PCTV or a television coupled to a computer system. For convenience, the system will be described as utilizing a PCTV 602. A data line 604, such as a cable modem, telephone line or other communication link, couples the PCTV 602 with a remote database, network server or on-line-service, such as the Internet 606. A television guide database 608 is also coupled to the Internet 606 for providing the television schedule information to PCTV 602. This information may be downloaded to PCTV 602, or it may be configured for viewing only while the viewer is actually connected to database 608. Alternatively, the television guide may be drawn locally from a processor within PCTV. As shown, a commercial provider 610 (e.g., Budweiser) and/or a television station broadcaster 612 (e.g., ABC) also have databases directly coupled to PCTV 602 or through Internet 606.

PCTV 602 may include a memory and a processor with appropriate software (not shown) for searching and retrieving information from databases on the Internet 606 based on user selections. Alternatively, this function may be provided through Internet 606, television guide database 608 or through the commercial provider 610 or broadcaster 612. In this embodiment, PCTV may access, download, and/or automatically upgrade an application or applet (e.g., a Java™ applet) having the appropriate software to run the television schedule guide on a display, e.g., a computer monitor, television display or other user interface.

In one example, the viewer is watching a sports event, such as a football game. One or more icons or other visual indicators are located on the television screen in a convenient location, such as the top, right corner. One of these icons may be an icon that represents the television schedule guide. The viewer can move a cursor or other visual indicator to the television guide icon and click thereon to open up the television guide as discussed in detail below. Another icon may be provided, for example, by a commercial sponsor. Moving into and activating this icon allows the viewer to link with a database provided by the commercial sponsor, or to a portion of the television schedule guide database that allows the viewer to purchase an advertised product, make a monetary contribution, respond to a survey, answer a question, or participating in contests with other viewers, for example.

By way of example, Budweiser may provide a database 610 that allows the viewer to purchase a coupon for a free six-pack or other items, such as Budweiser T-shirts, hats, etc.

The viewer may purchase the coupon, hats, or T-shirts directly through the commercial sponsor, or through a delivery system provided by the television schedule guide (discussed in detail below). This type of advertising allows the advertiser to directly target a particular program, and it allows the viewer to directly purchase the products during the advertisement. In addition, viewers will not forget the advertisement or simply lose motivation to spend money or request information after the commercial or program is over.

In another example, the television network that is broadcasting the program may provide an icon that allows the viewer to access a database 612 providing more information about the football game, previews of upcoming programs related to the program, such as another football game later on in the week, or other products and services related to the football game.

FIGS. 12-17 illustrate a sample television schedule system 700 with a grid guide, and methods for utilizing the television schedule system with the contextual linking system and method of the present invention. Of course, it should be recognized that the invention is not limited to the specific television schedule system shown in FIGS. 12-17. For example, other suitable television schedule systems are described in the user manuals "Using Starsight 2", "Starsight Interactive Television Program Guide, Phase III", and "Starsight Interactive Television Program Guide, Phase IV", which are attached to this application as Appendices A, B, and C, respectively, or commonly assigned U.S. Pat. Nos. 5,353,121, 5,479,266, the complete disclosures of which are incorporated herein by reference. The television schedule system shown in FIGS. 12-17, however, is particularly advantageous with the contextual linking system of the present invention as it enables the viewer to quickly and efficiently browse through the television schedule, and to interact with a wide range of services that are related to the programs in the television schedule.

Figure 12A:
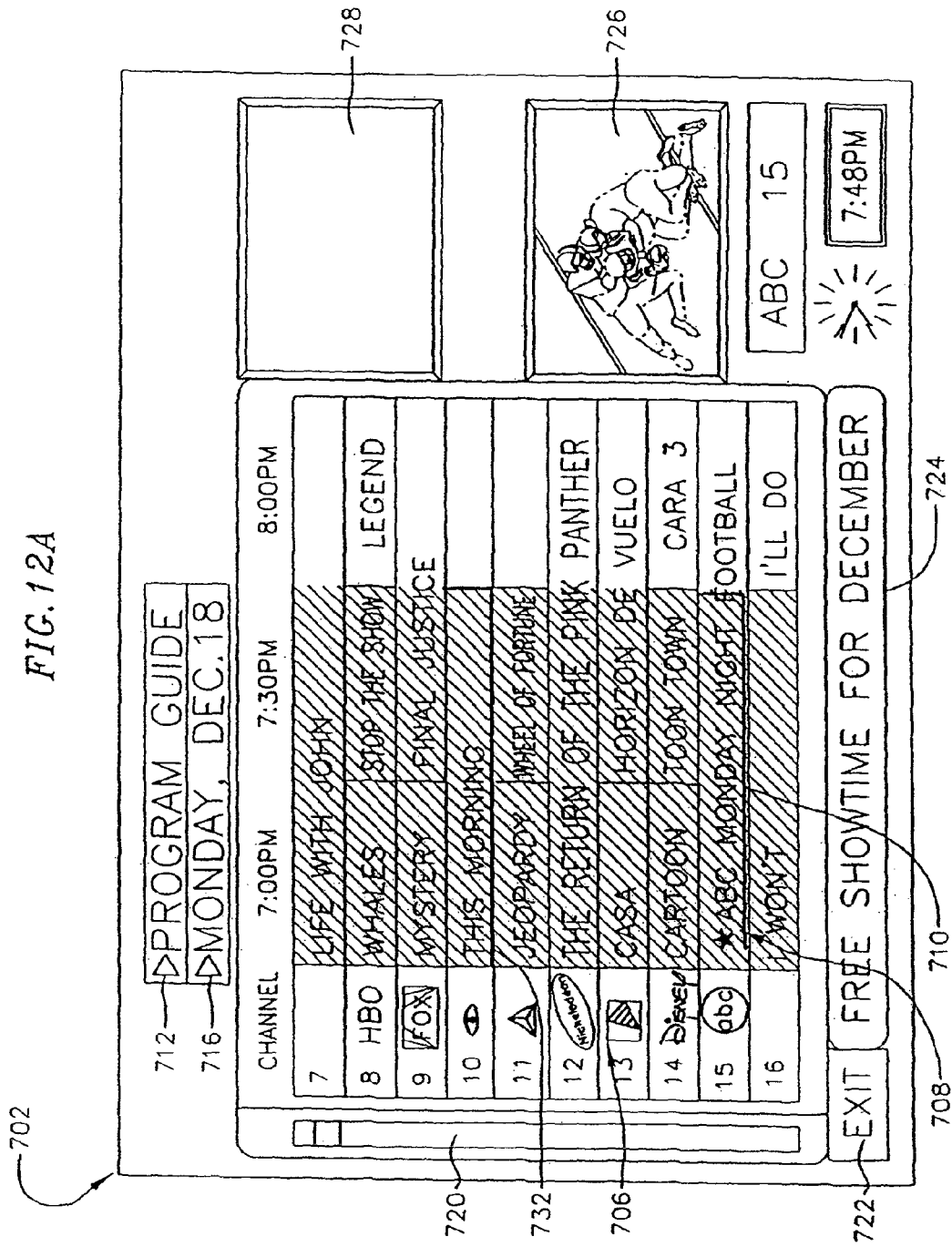

FIGS. 12A and 12B illustrate a program guide 702 and a channel guide 704, respectively, for the television schedule system of the present invention. The program guide 702, which is the primary mode in the television schedule system, includes a number of screen information areas or windows in a particular screen where the viewer operates a input device, such as a remote control, to move around vertically and horizontally and to interact with that screen area's function. Within each screen area are one or more items, typically arranged in a matrix or grid so that the viewer can scroll through the grid to select or activate items within the grid. Activation of an item will invoke a Submenu, a Dialog, a Panel, invoke an action or the like.

As shown in FIG. 12A, program guide 702 includes a number of other information areas. For example, program guide 702 includes a mode menu area 712 that indicates the currently active mode (i.e., program guide 702) and allows the viewer to pull down a mode menu (see FIG. 15A). Program guide 702 also includes a date area 716 that indicates the date reflected in program matrix 706 and allows the viewer to pull down a date submenu to change the date. In other submodes, the submode menu will display options for ordering or displaying lists that are appropriately related to the submode. A proportional scroll bar 720 located to the left of program matrix 706 is visually proportional to the total information in program matrix 706 to provide visual feedback as the user vertically scrolls through matrix 706. In addition, scroll bar 720 may be used for large-scale movement through hundreds of channels/sources by navigating to bar 720 and then vertically moving bar 720. An exit area 722 allows the viewer to immediately exit back to the television by navigating to exit area 722 and clicking on the remote control device. A program area 726 depicts the currently tuned program and a preview window area 728 can be used for all types of promotional, descriptional, or contextual video or graphics, such as a short preview of the show that is currently being highlighted in show matrix 706. Preview window area 728 may also be interactional similar to the other areas of guide 702.

As shown in FIG. 12A, program guide 702 includes a number of other information areas. For example, program guide 702 includes a mode menu area 712 that indicates the currently active mode (i.e., program guide 702) and allows the viewer to pull down a mode menu 714 (see FIG. 13A). Program guide 702 also includes a date area 716 that indicates the date reflected in program matrix 706 and allows the viewer to pull down a date submenu 718 to change the date. In other submodes, the submode menu will display options for ordering or displaying lists that are appropriately related to the submode. A proportional scroll bar 720 located to the left of program matrix 706 is visually proportional to the total information in program matrix 706 to provide visual feedback as the user vertically scrolls through matrix 706. In addition, scroll bar 720 may be used for large-scale movement through hundreds of channels/sources by navigating to bar 720 and then vertically moving bar 720. An exit area 722 allows the viewer to immediately exit back to the television by navigating to exit area 722 and clicking on the remote control device. A program area 726 depicts the currently tuned program and a preview window area 728 can be used for all types of promotional, descriptional, or contextual video or graphics, such as a short preview of the show that is currently being highlighted in show matrix 706. Preview window area 728 may also be interactional similar to the other areas of guide 702.

The program guide may also include a variety of additional areas to facilitate use of the television schedule system, present information to the viewer or advertise programs or other products. For example, a scrolling commercial message 724 may be located underneath program matrix 706 that advertises programs or products from program sponsors, etc. The viewer may navigate to message 724 to receive more information or to purchase the product or program.

This function of ordering items is not limited to videos. For example, the program may access other contextual linked services such as a commercial store, etc., to allow the purchaser to buy a wide variety of different services or goods directly or indirectly linked to a particular program. For example, an Info Menu for Monday Night Football may allow the viewer to scroll through submenus that allow the viewer to purchase Washington Redskins' caps, Minnesota Vikings caps or any NFL cap. The viewer has a choice to follow a program's link back to the commercial area where a larger selection of items and services are available. A product like the cap above may lead the viewer directly to an NFL proshop, whereas a link to a movie on demand may lead back to a commercial film library.

FIG. 12B illustrates the television schedule system of the present invention in the channel guide mode. As shown, channel guide 704 is similar to program guide 702 except that it includes an information screen area 730 that is reversed from the information screen area 706 in the program guide. Thus, the viewer can scroll vertically to move forward and backward in time along one channel and horizontally to move from channel to channel.

Figure 13A:
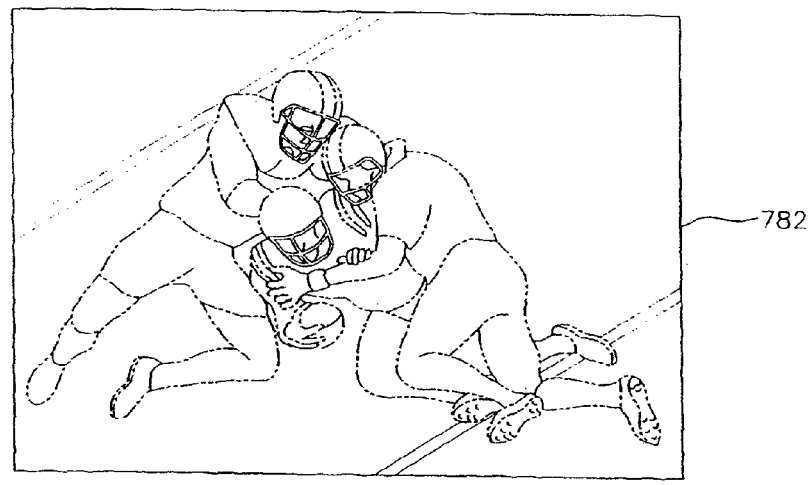
FIGS. 13A-13C are schematic views illustrating a method for selecting a program information menu, moving to the program guide of FIG. 12A and browsing through information menus from other programs.
Figure 13B:
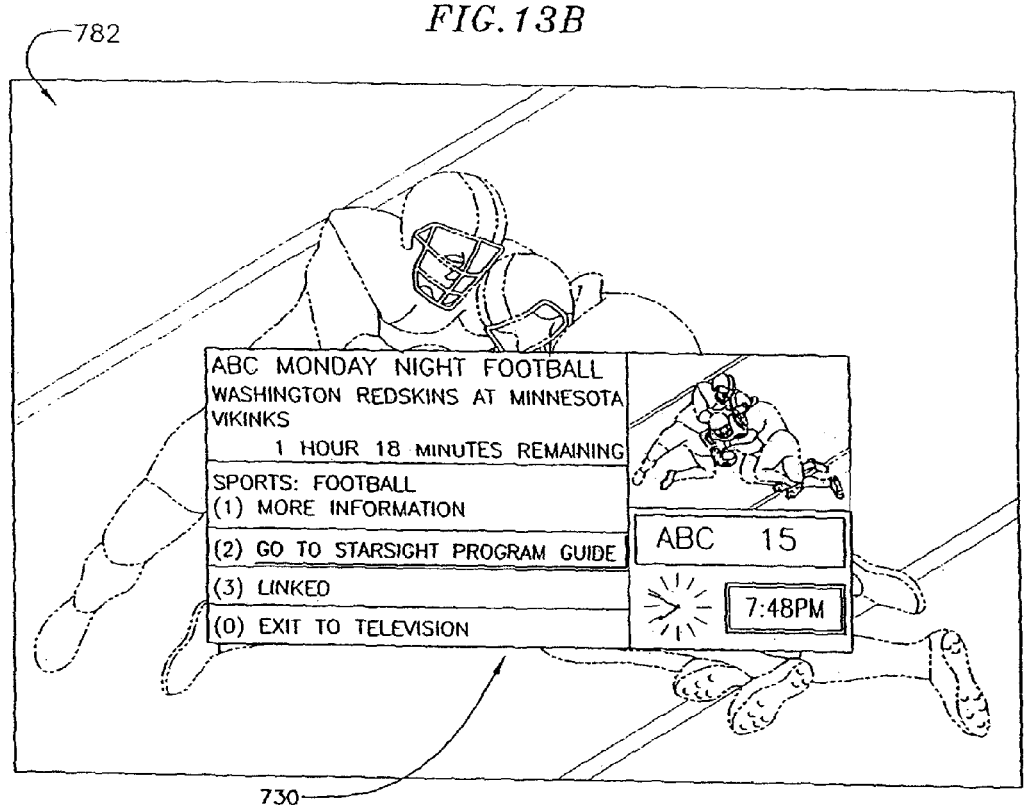
Figure 13C:
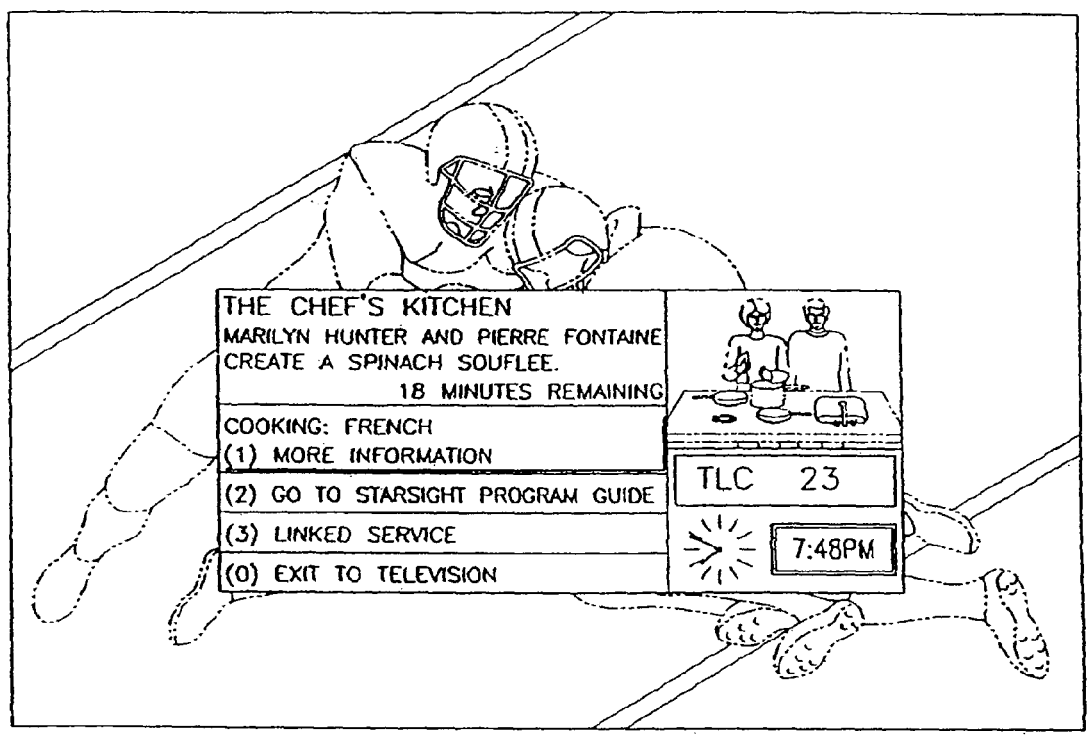

FIGS. 13A-13C illustrate a method of accessing program guide 702 from a currently tuned program and browsing through other currently tuned programs with remote control device 2. As shown in FIG. 13A, the viewer is watching a television show on a display screen 782, such as a Monday Night Football game featuring the Washington Redskins versus the Minnesota Vikings. Clicking on the remote control device automatically causes a Program InfoMenu 730 to pop up on a portion of the television screen 782 (see FIG. 13B). Program InfoMenu 730 may allow the viewer to obtain more information about the currently tuned program, move to program guide 702, move to contextual linked services (discussed below), or exit InfoMenu 730 back to the television show. The viewer may vertically scroll through these options upwards or downwards, and select one of the options. For example, clicking on the "Go to program guide" section immediately transfers the viewer to the program guide, as shown in FIG. 12A. To browse other currently tuned programs, the viewer employs suitable channel controls or other input commands on the remote control device (not shown). As shown in FIG. 13C, the viewer may browse through other information menus while viewing the currently tuned program.

Figure 14A:
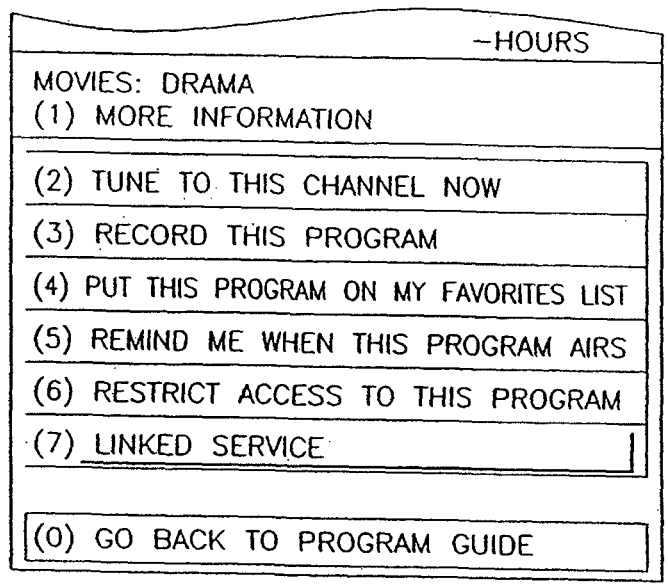
FIGS. 14A-14E illustrate a Video On Demand menu and an associated submode menu.
Figure 14B:
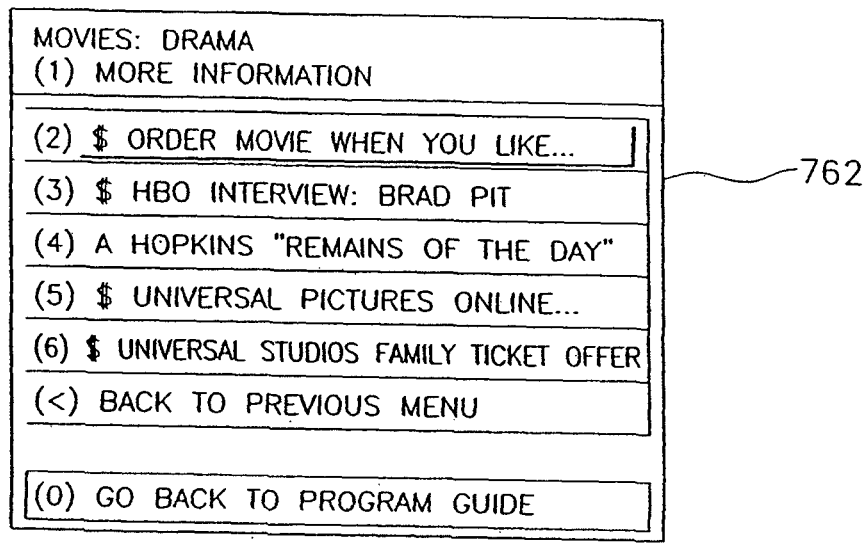
Figure 14C:
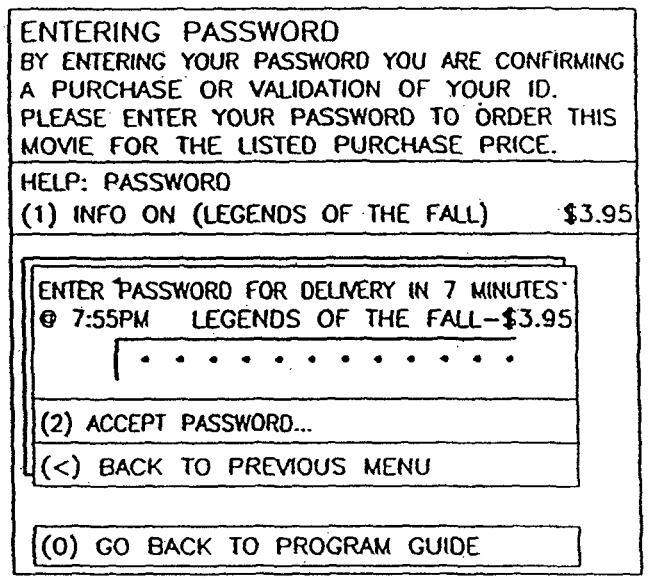
Figure 14D:
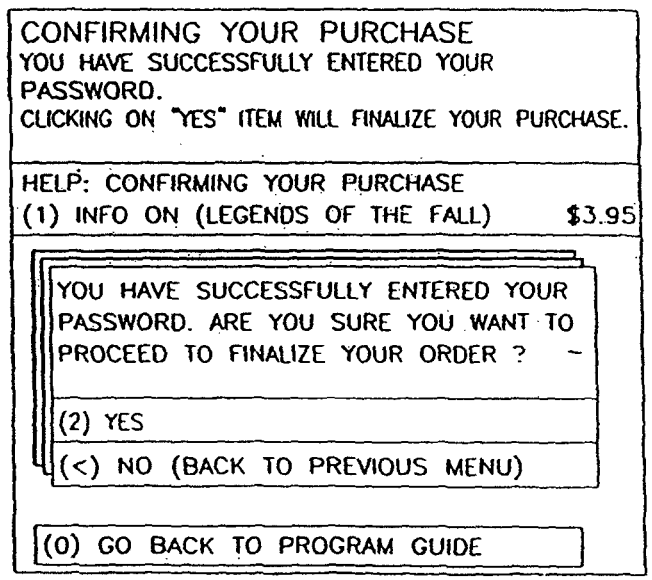
Figure 14E:
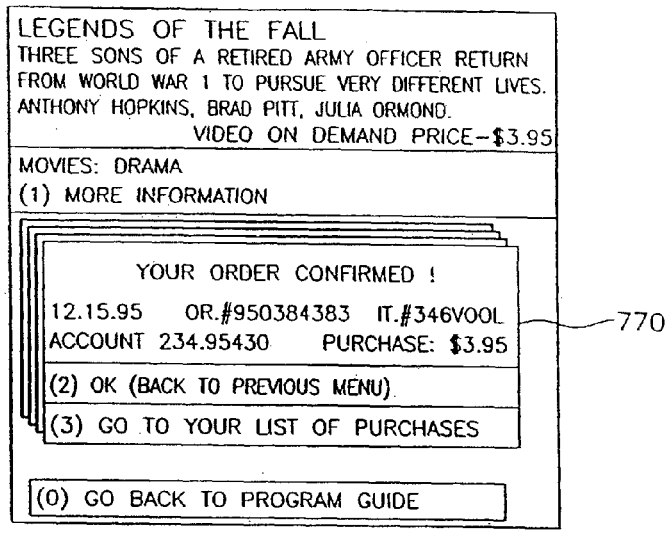

FIGS. 14A-14E illustrate a method of ordering video on demand with the system of the present invention. As shown in 14A, the viewer opens up the program's InfoMenu 730 and scrolls down to the "linked services" item. The viewer is then presented with an easily scrollable menu 762 of items and services associated with this program, as shown in FIG. 14B. Some, denoted with a dollar sign, are purchasable. Free items would be instantly accessible to the viewer. Here, the viewer may be prompted to a simple procedure to specify when the movie is to be delivered. When the viewer selects a particular service or item requiring a financial transaction, a purchasing sequence unfolds. As shown in FIG. 14C, the viewer is prompted to enter the master password/access code via the remote keypad or other means. For example, the viewer could swipe his or her credit card through a slot on the remote control device. If the password/access code is accepted, the viewer is given a final opportunity to review the purchase and/or either confirm or return to the previous item menu (see FIG. 14D). When the viewer confirms his or her purchase and/or order, a receipt 770 is shown (FIG. 14E). The viewer is given the choice of returning to the previous item menu or, as always, at the very bottom item "0", to return to the program guide.

Figure 15A:
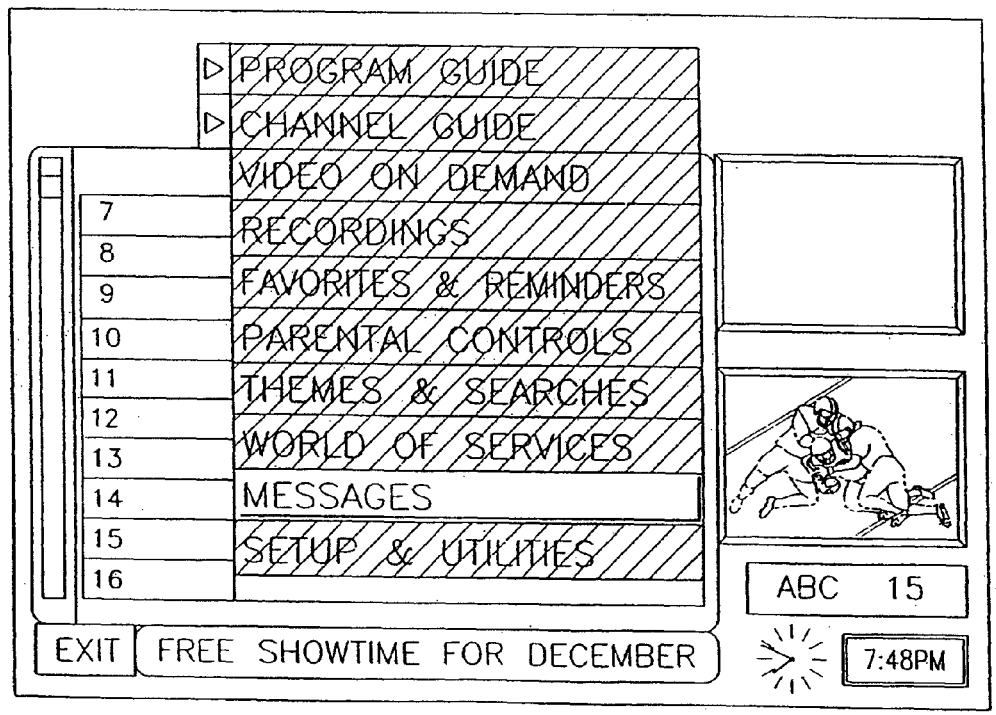
FIGS. 15A-15C illustrate a method for accessing and sending mail messages.
Figure 15B:
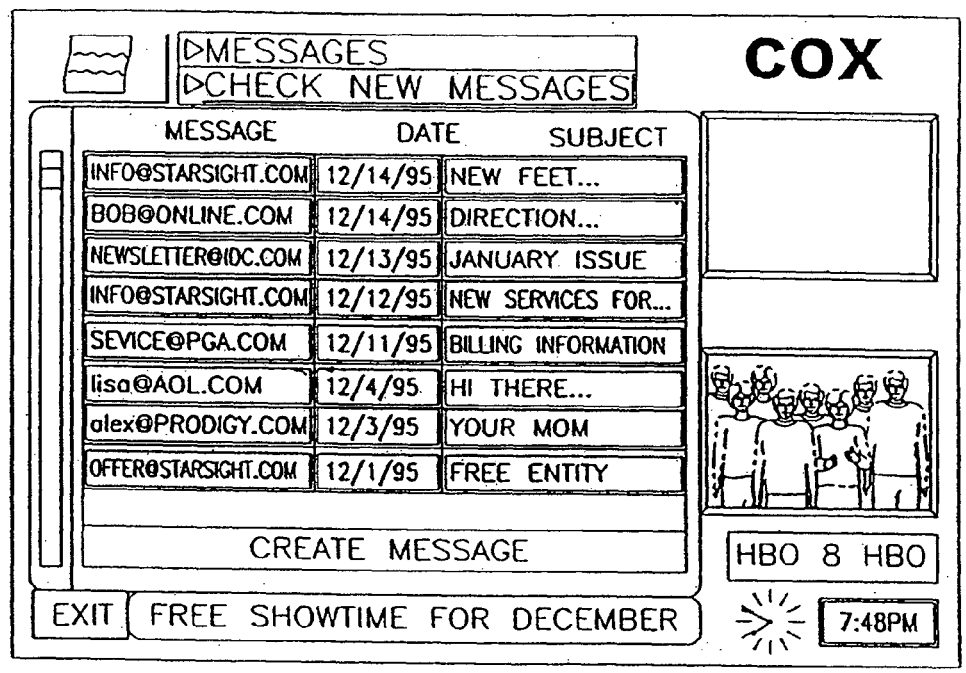
Figure 15C:
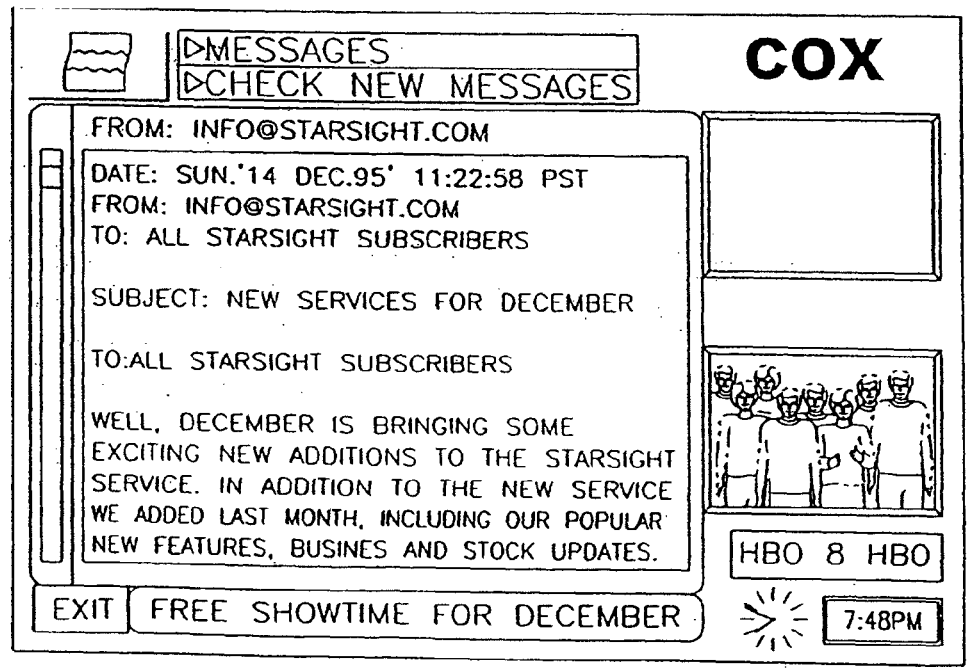

FIGS. 15A-15C illustrate another embodiment of the present invention in which the television viewer may accept incoming e-mail messages or send outgoing messages to other television viewers or users connected to the television schedule system, e.g., users on the Internet. As shown in FIG. 15A, the viewer scrolls down to the Messages window in the Mode menu and activates this window to enter a submode menu. To read incoming messages, the viewer scrolls down to the "Check new messages" cell and activates this cell to display messages that have been received. The Messages mode organizes incoming messages in order of date received and displays them in lists (see FIG. 15B). The viewer may then scroll to a particular message, as shown in FIG. 15C. To send outgoing messages, the viewer scrolls down to the "Create message" cell and activates this cell to open up a blank window. A message may be created by inputting text on the input device, through voice activation via a microphone on the input device.

Figure 16A:
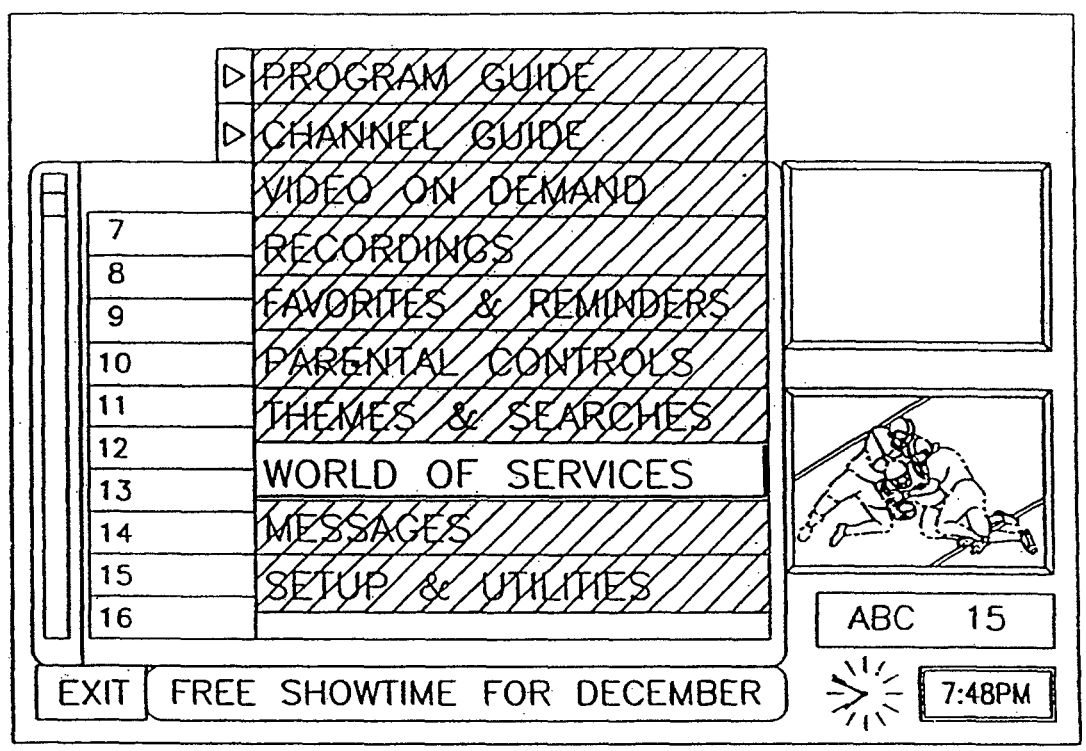
FIGS. 16A-16C illustrate a Services Menu and a method for accessing special services and for purchasing items.
Figure 16B:
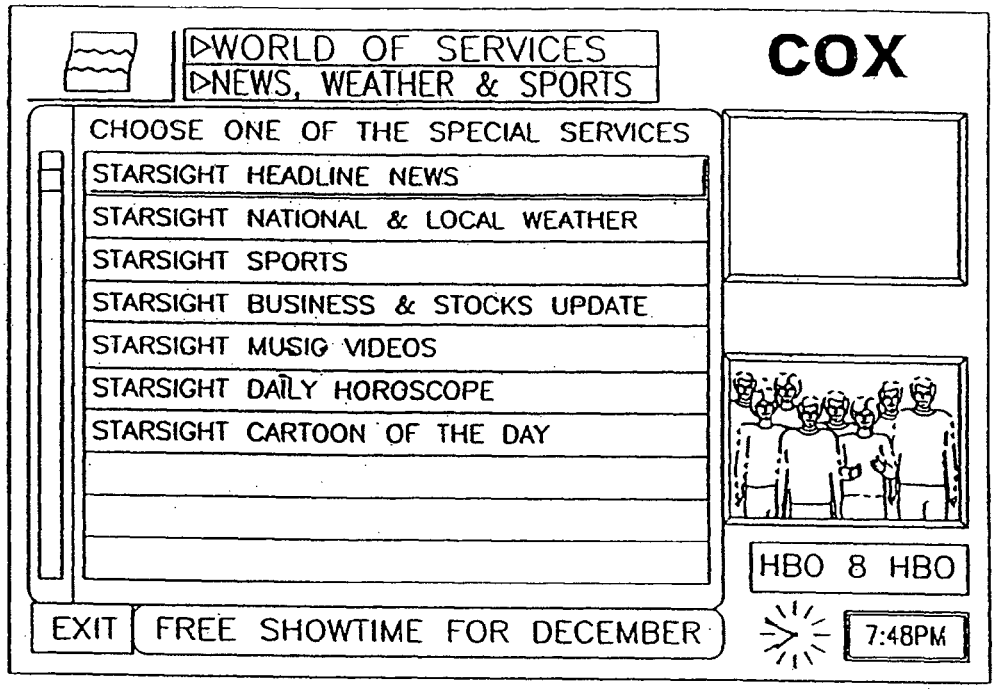
Figure 16C:
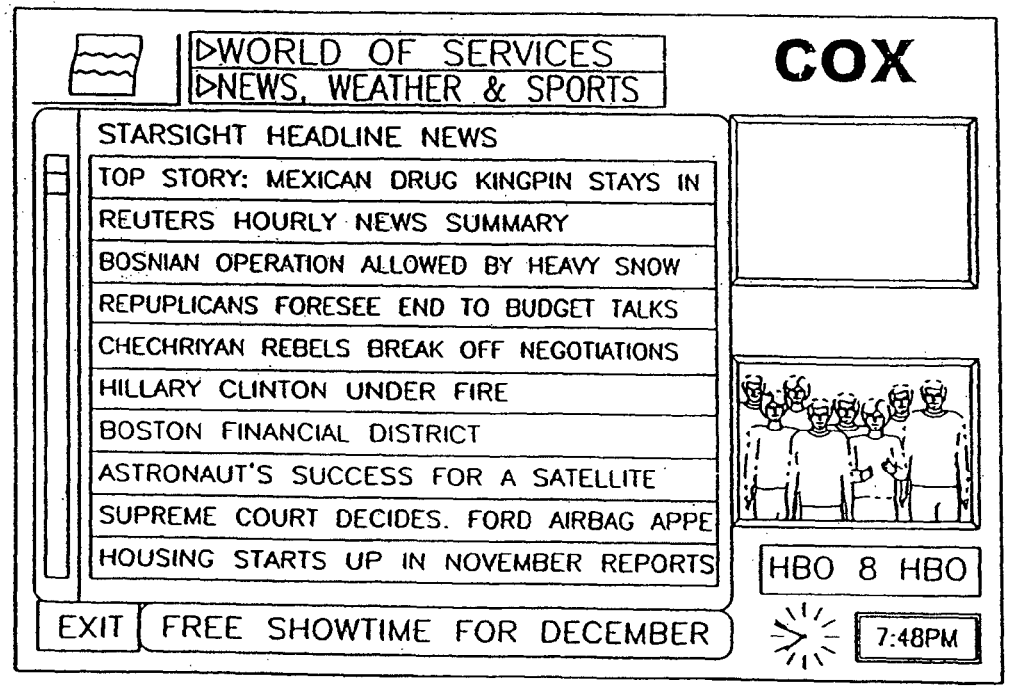

FIGS. 16A-16C illustrate a method of accessing a whole variety of other services to the Internet with the interactive television schedule system of the present invention. As discussed above, databases on the Internet may be accessed through a telephone line, cable modem or other means of communication. As shown in FIG. 16A, the user scrolls down to the world of services mode and clicks on this mode to obtain a submode that includes a variety of different services, such as news, weather and sports, previews and reviews of programs on the television schedule guide, a super mall for purchasing products and services related to the programs in the television schedule guide, or other products and services on the Internet or World Wide Web. As shown in FIG. 16C, the user has selected news, weather and sports, which opens up another menu involving a variety of special services, such as headline news, national and local weather, sports central, business and stock updates, music videos, daily horoscope cartoon of the day and/or other services related to news, weather and sports. These services may be provided by a special database that is linked to the television system, to an on-line information provider, such as America On Line, Prodigy and the like, or with a search engine that searches network servers or databases on the Internet and World Wide Web. As shown, the user selects headline news which opens up another menu providing the user with a variety of news reports that may be accessed. The news reports may be viewed, printed out, or downloaded to the computer system that is attached to or an intricate part of the television system, (e.g., PCTV).

Figure 17A:
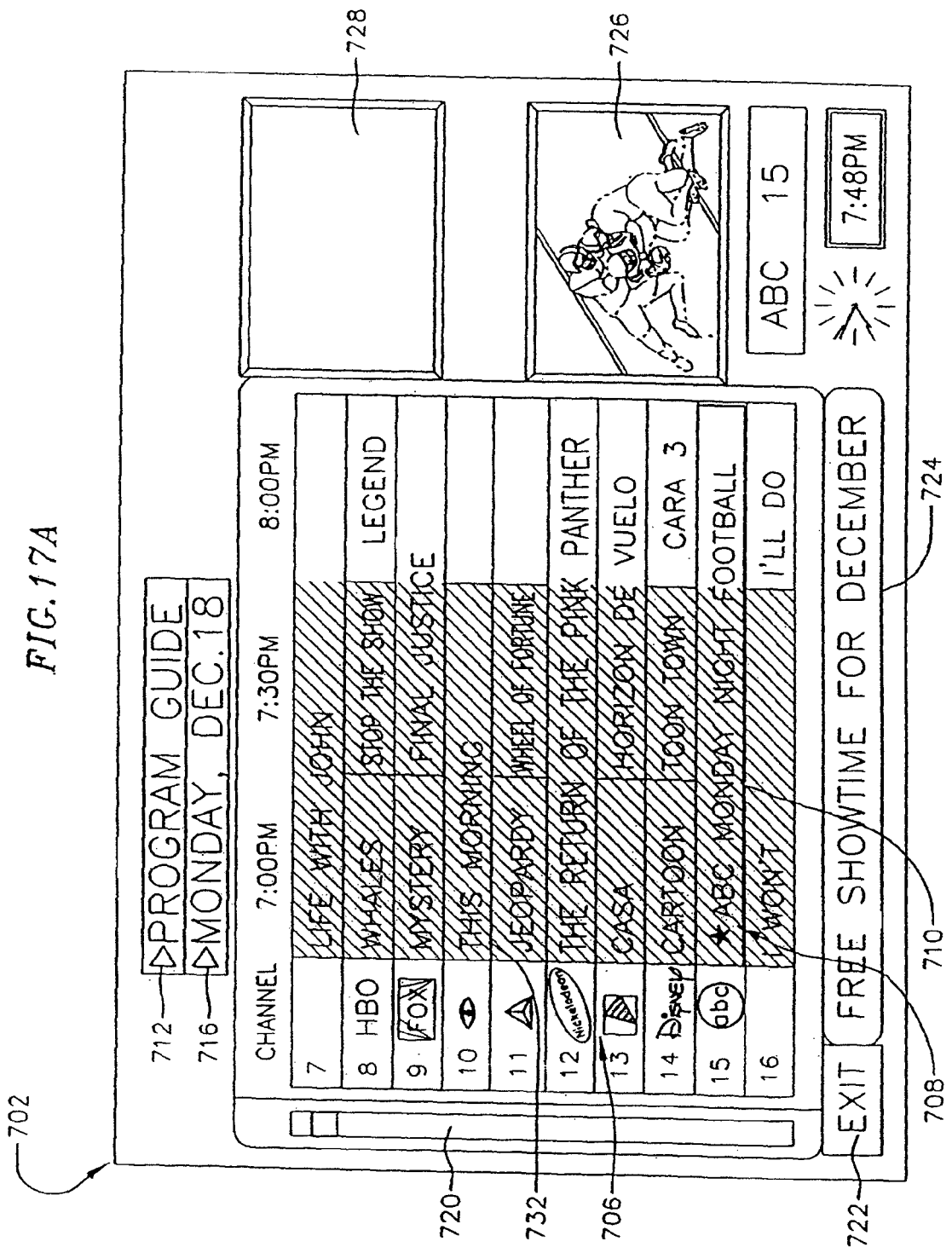
Figure 17B:
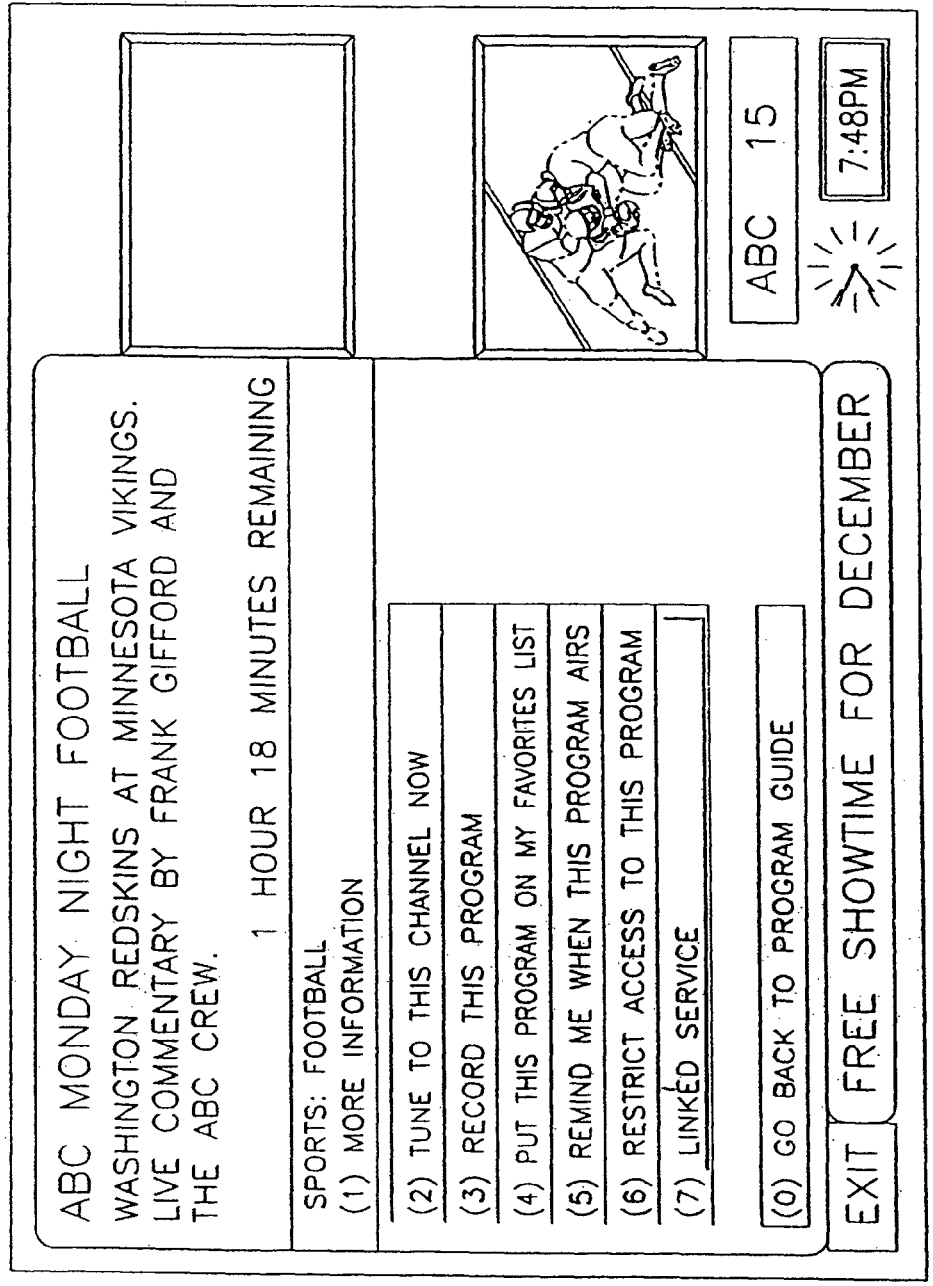
Figure 17C:
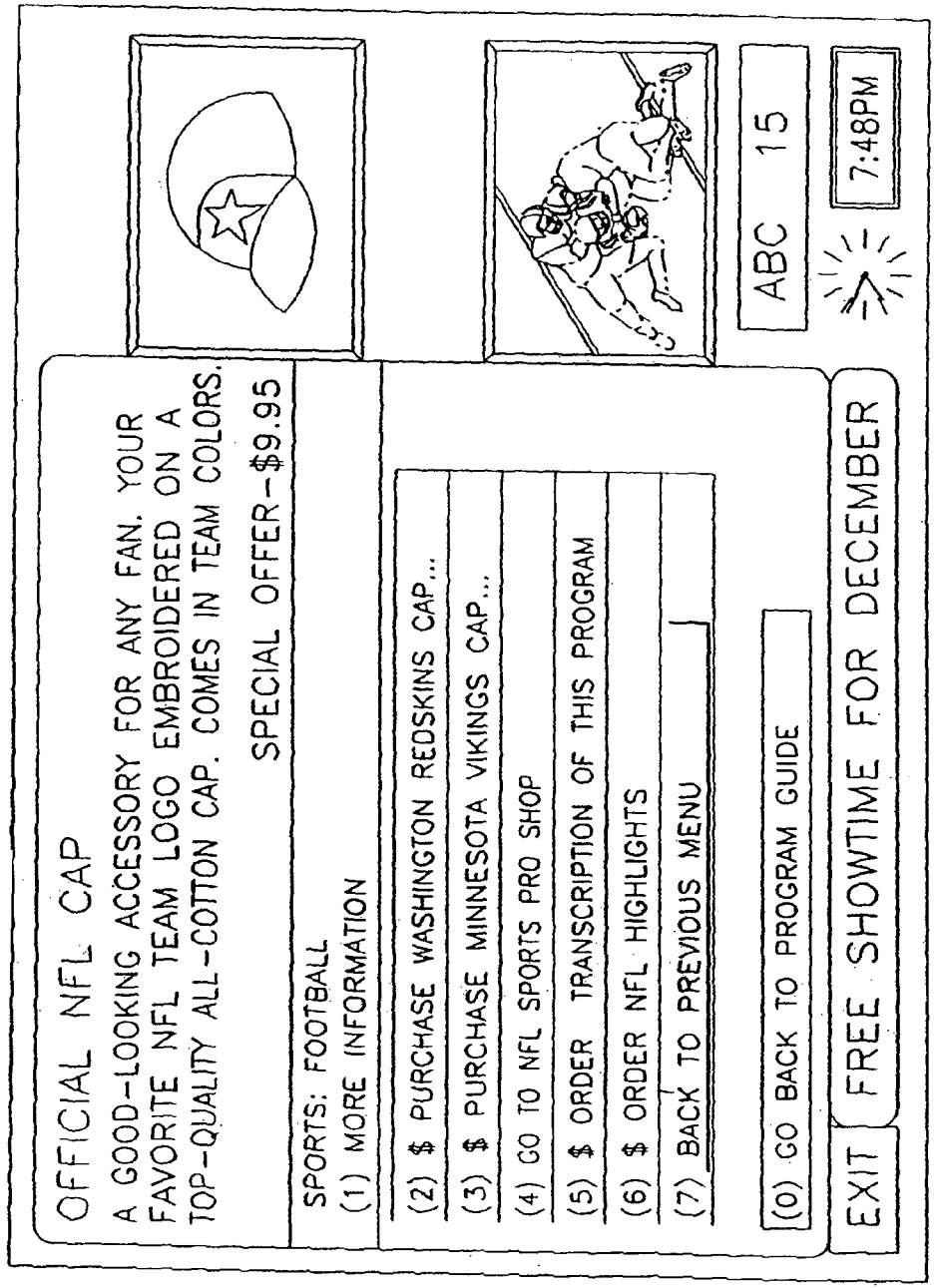

FIGS. 17A-17F illustrate a representative system and method for contextually linking related items and services to a particular program in the program guide 702. As shown in FIG. 17A, the viewer selects a particular program within guide 702, to access that program's info menu. Within the info menu, the viewer then scrolls to linked services and clicks on this window to move into a database that includes items and services contextually related to that particular program. In the example shown, the viewer has been watching a sport event featuring the Washington Redskins v. the Minnesota Vikings. The viewer is transferred to a window that provides a number of options for purchasing items and services related to that game, such as Washington Redskin or Minnesota Vikings paraphernalia, other NFL teams paraphernalia (in an NFL sports pro shop), or highlights of other games between these two or other teams. Alternatively, the viewer may order a tape/transcript of the program that is currently being shown on the guide. FIGS. 17C-17F illustrate a case in which the viewer has selected purchasing a Washington Redskin cap. The viewer inputs a password or other input identification, which is confirmed by the system. Alternatively, the viewer can simply swipe his or her credit card or other identification card through the remote control device or the television system to authorize the purchase of the Redskins' cap. The order is confirmed and the cap is delivered to the viewer's home.

Although the foregoing invention has been described in detail for purposes of clarity, it will be obvious that certain modifications may be practiced within the scope of the appended claims. For example, the viewer can automatically tune to a desired program or can select different programs for automatic recording and/or retrieval and digital storage. For more information on automatic tuning and automatic recording, see U.S. Pat. No. B1 4,706,121; this patent is like the present patent application, assigned to Starsight Telecast, Inc. U.S. Pat. No. B1 4,706,121 is hereby incorporated by reference in its entirety for all purposes.

The invention claimed is:
1. A method for transmitting video clips over the Internet, implemented on a system including a data port, comprising:
    receiving a request for a web page via the data port; and
    generating the web page, wherein the web page includes a first interactive media asset identifier for linking a viewer of the web page to a first remote server and a second interactive media asset identifier for linking the viewer to a second remote server, and wherein, in response to a user selection of the first media asset identifier, the first remote server:
  transmits a video clip corresponding to the first interactive media asset identifier over a data network for immediate viewing, and
  generates for display information that is contextually related to the video clip, wherein the information is caused to be displayed simultaneously with the video clip.

2. The method of claim 1, wherein the web page includes descriptive information related to the video clip.

3. The method of claim 2, wherein the descriptive information is an editorial comment.

4. The method of claim 1, wherein the video clip is transmitted exclusively to the viewer.

5. The method of claim 1, wherein the video clip is interactive.

6. The method of claim 1, wherein the first interactive media asset identifier corresponds to a recommended video clip.

7. The method of claim 1, wherein the first interactive media asset identifier is presented within a media guide.

8. The method of claim 1, wherein the web page includes a field for searching the data network for information contextually related to the video clip.

9. The method of claim 1, wherein the generating step and the transmitting step are performed by a server module.

10. A system for transmitting video clips over the Internet, the system comprising a web server, the web server comprising a processor configured to:
  receive a request for a web page; and
  generate the web page, wherein the web page includes interactive media asset identifiers, wherein a first interactive media asset identifier includes a first programmatic action for linking a viewer interface to a first remote server, and wherein a second interactive media asset identifier includes a second programmatic action for linking the viewer interface to a second remote server, and wherein, in response to a user selection of the first interactive media asset identifier, the first programmatic action causes the first remote server to:
    transmit a video clip corresponding to the first interactive media asset identifier to the viewer interface over a data network for immediate viewing, and
    generate for display information that is contextually related to the video clip, wherein the information is caused to be displayed simultaneously with the video clip.

11. The system of claim 10, wherein the web page includes descriptive information related to the video clip.

12. The system of claim 11, wherein the descriptive information is an editorial comment.

13. The system of claim 10, wherein the video clip is transmitted exclusively to the viewer interface.

14. The system of claim 10, wherein the video clip is interactive.

15. The system of claim 10, wherein the first interactive media asset identifier corresponds to a recommended video clip.

16. The system of claim 10, wherein the first interactive media asset identifier is presented within a media guide.

17. The system of claim 10, wherein the web page includes a field for searching the data network for information contextually related to the video clip.

18. A method for transmitting video clips over the Internet, implemented on a system including a data port, comprising:
  receiving a request for a web page via the data port; and
  generating the web page, wherein the web page includes a first interactive media asset identifier for linking a viewer of the web page to a first remote server and a second interactive media asset identifier for linking the viewer to a second remote server, and wherein, in response to a user selection of the first interactive media asset identifier, the first remote server:
    transmits a video clip corresponding to the first interactive media asset identifier over a data network, and
    generates for display a selectable option during the transmission of the video clip, wherein a selection of the selectable option causes a function to be invoked in relation to the video clip.

19. The method of claim 18, wherein the web page includes descriptive information related to the video clip.

20. The method of claim 19, wherein the descriptive information is an editorial comment.

21. The method of claim 18, wherein the video clip is transmitted exclusively to the viewer.

22. The method of claim 18, wherein the video clip is interactive.

23. The method of claim 18, wherein the first interactive media asset identifier corresponds to a recommended video clip.

24. The method of claim 18, wherein the first interactive media asset identifier is presented within a media guide.

25. The method of claim 18, wherein the web page includes a field for searching the data network for information contextually related to the video clip.

26. The method of claim 18, wherein the function, when invoked, causes a media asset corresponding to the video clip to be recorded.

27. The method of claim 18, wherein the function, when invoked, causes a media asset corresponding to the video clip to be played.

28. The method of claim 18, wherein the function, when invoked, causes metadata of a media asset corresponding to the video clip to be marked.

29. The method of claim 18, wherein the function, when invoked, causes a reminder associated with a media asset corresponding to the video clip to be set.

30. The method of claim 18, wherein the function, when invoked, causes access to a media asset corresponding to the video clip to be restricted.

31. The method of claim 18, wherein the video clip is transmitted to the viewer for immediate viewing.

32. A system for transmitting video clips over the Internet, the system comprising a web server, the web server comprising a processor configured to:
  receive a request for a web page; and
  generate the web page, wherein the web page includes a first interactive media asset identifier for linking a viewer to a first remote server and a second interactive media asset identifier for linking the viewer to a second remote server, and wherein, in response to a user selection of the first media asset identifier, the first remote server:
    transmits a video clip corresponding to the first interactive media asset identifier to the viewer over a data network, and
    generates for display a selectable option during the transmission of the video clip, wherein a selection of the selectable option causes a function to be invoked in relation to the video clip.

33. The system of claim 32, wherein the web page includes descriptive information related to the video clip.

34. The system of claim 33, wherein the descriptive information is an editorial comment.

35. The system of claim 32, wherein the video clip is transmitted exclusively to the viewer interface.

36. The system of claim 32, wherein the video clip is interactive.

37. The system of claim 32, wherein the first interactive media asset identifier corresponds to a recommended video clip.

38. The system of claim 32, wherein the first interactive media asset identifier is presented within a media guide.

39. The system of claim 32, wherein the web page includes a field for searching the data network for information contextually related to the video clip.

40. The system of claim 32, wherein the function, when invoked, causes a media asset corresponding to the video clip to be recorded.

41. The system of claim 32, wherein the function, when invoked, causes a media asset corresponding to the video clip to be played.

42. The system of claim 32, wherein the function, when invoked, causes metadata of a media asset corresponding to the video clip to be marked.

43. The system of claim 32, wherein the function, when invoked, causes a reminder associated with a media asset corresponding to the video clip to be set.

44. The system of claim 32, wherein the function, when invoked, causes access to a media asset corresponding to the video clip to be restricted.

45. The system of claim 32, wherein the video clip is transmitted to the viewer for immediate viewing.

46. A method for transmitting video clips over the Internet, implemented on a system including a data port, comprising:
receiving a request for a web page via the data port; and
generating the web page, wherein the web page includes a first interactive media asset identifier for linking a viewer of the web page to a first remote server and a second interactive media asset identifier for linking the viewer to a second remote server, and wherein the first media asset identifier is configured to, when selected, cause (i) a video clip corresponding to the first interactive media asset identifier and (ii) information that is contextually related to the video clip to be transmitted for simultaneous display.

47. The method of claim 46, wherein the web page includes descriptive information related to the video clip.

48. The method of claim 47, wherein the descriptive information is an editorial comment.

49. The method of claim 46, wherein the video clip is transmitted exclusively to the viewer.

50. The method of claim 46, wherein the video clip is interactive.

51. The method of claim 46, wherein the first interactive media asset identifier corresponds to a recommended video clip.

52. The method of claim 46, wherein the first interactive media asset identifier is presented within a media guide.

53. The method of claim 46, wherein the web page includes a field for searching the data network for information contextually related to the video clip.

54. A system for transmitting video clips over the Internet, the system comprising a web server, the web server comprising a processor configured to:
receive a request for a web page; and
generate the web page, wherein the web page includes interactive media asset identifiers, wherein a first interactive media asset identifier includes a first programmatic action for linking a viewer interface to a first remote server, wherein a second interactive media asset identifier includes a second programmatic action for linking the viewer interface to a second remote server, and wherein the first media asset identifier is configured to, when selected, cause (i) a video clip corresponding to the first interactive media asset identifier and (ii) information that is contextually related to the video clip to be transmitted for simultaneous display.

55. The system of claim 54, wherein the web page includes descriptive information related to the video clip.

56. The system of claim 55, wherein the descriptive information is an editorial comment.

57. The system of claim 54, wherein the video clip is transmitted exclusively to the viewer interface.

58. The system of claim 54, wherein the video clip is interactive.

59. The system of claim 54, wherein the first interactive media asset identifier corresponds to a recommended video clip.

60. The system of claim 54, wherein the first interactive media asset identifier is presented within a media guide.

61. The system of claim 54, wherein the web page includes a field for searching the data network for information contextually related to the video clip.

* * * * *